US012355685B2

(12) United States Patent
Sridharan et al.

(10) Patent No.: US 12,355,685 B2
(45) Date of Patent: Jul. 8, 2025

(54) FREQUENCY HOPPING AND AVAILABLE SLOT DETERMINATION FOR FULL-DUPLEX OPERATION

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US); Hung Dinh Ly, San Diego, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/881,401

(22) Filed: Aug. 4, 2022

(65) Prior Publication Data

US 2024/0048299 A1 Feb. 8, 2024

(51) Int. Cl.
| | |
|---|---|
| *H04L 5/00* | (2006.01) |
| *H04L 1/08* | (2006.01) |
| *H04L 5/14* | (2006.01) |
| *H04W 72/04* | (2023.01) |
| *H04W 72/0446* | (2023.01) |
| *H04W 72/0453* | (2023.01) |
| *H04W 72/21* | (2023.01) |

(52) U.S. Cl.
CPC .............. *H04L 5/0012* (2013.01); *H04L 1/08* (2013.01); *H04L 5/14* (2013.01); *H04W 72/0446* (2013.01); *H04W 72/0453* (2013.01); *H04W 72/21* (2023.01)

(58) Field of Classification Search
CPC ......... H04W 72/0446; H04W 72/0453; H04W 72/02; H04L 1/08; H04L 5/0044; H04L 5/14; H04L 5/0012
See application file for complete search history.

(56) References Cited

U.S. PATENT DOCUMENTS

| | | | |
|---|---|---|---|
| 2022/0182160 A1* | 6/2022 | Su | ........................ H04B 17/309 |
| 2022/0231808 A1* | 7/2022 | Oh | ....................... H04L 25/0224 |
| 2023/0007641 A1* | 1/2023 | Kim | ..................... H04W 72/044 |

(Continued)

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) may receive a message indicating a frequency hopping configuration for repetitions of an uplink message that are to be transmitted via a set of resources, including one or more resources that support full-duplex communications. The UE may determine that some resources of the set of resources are available for transmitting the repetitions in a time domain. The UE may use a frequency hopping pattern to transmit the uplink message and the repetitions of the uplink message, where the frequency hopping pattern may include two or more frequency hops and based on the available resources and the frequency hopping configuration. In some cases, the UE may determine that some resources of the set of resources are unavailable in a frequency domain, and as such, the UE may drop respective transmissions of the uplink messages on the unavailable resources.

26 Claims, 16 Drawing Sheets

(56) References Cited

U.S. PATENT DOCUMENTS

| | | | |
|---|---|---|---|
| 2023/0055304 A1* | 2/2023 | Shim | H04W 72/541 |
| 2023/0276504 A1* | 8/2023 | Kim | H04W 74/0833 370/329 |

* cited by examiner

FREQUENCY HOPPING AND AVAILABLE SLOT DETERMINATION FOR FULL-DUPLEX OPERATION

FIELD OF TECHNOLOGY

The following relates to wireless communications, including frequency hopping and available slot determination for full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some wireless communications systems, a UE may use frequency hopping to transmit uplink messages to a network entity. However, frequency hopping techniques when full-duplex operation is enabled may be improved.

SUMMARY

The described techniques relate to improved methods, systems, devices, and apparatuses that support frequency hopping and available slot determination for full-duplex operation. For example, the described techniques provide for determining available resources and frequency hopping patterns when a user equipment (UE) is to transmit an uplink message and one or more repetitions of the uplink message using at least some resources configured for full-duplex operation (e.g., sub-band full-duplex (SBFD) operation). In some examples, when SBFD operation is enabled, the UE may determine two or more available resources (e.g., slots) before determining a frequency hopping pattern (e.g., an inter-slot frequency hopping pattern) for transmitting one or more uplink messages. For example, the UE may receive a control message indicating a frequency hopping configuration for one or more repetitions of an uplink message that the UE is to transmit via a set of resources. Some resources of the set of resources may be configured for SBFD operation (e.g., may include downlink and uplink resources within a same slot). The UE may determine that one or more resources of the set of resources are available, and accordingly, may transmit the uplink message and the one or more repetitions of the uplink message via the one or more available resources and based on a frequency hopping pattern, where the UE may determine the frequency hopping pattern based on the available resources and the frequency hopping configuration. In some examples, each frequency hop of the frequency hopping pattern may use a different available resource. In some cases, the UE may drop transmission of a repetition of the uplink message if a frequency-domain resource allocation (FDRA) for one or more available resources is unavailable due to the SBFD operation.

A method for wireless communication at a UE is described. The method may include receiving a control message indicating a frequency hopping configuration for one or more repetitions of an uplink message, the one or more repetitions of the uplink message to be transmitted via a set of resources that includes one or more resources that support full-duplex communications, determining a set of multiple available resources of the set of resources for the one or more repetitions of the uplink message based on a quantity of the one or more repetitions of the uplink message and the set of resources, and transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

An apparatus for wireless communication at a UE is described. The apparatus may include a processor, and a memory coupled with the processor, wherein the memory comprises instructions executable by the processor to cause the apparatus to receive a control message indicating a frequency hopping configuration for one or more repetitions of an uplink message, the one or more repetitions of the uplink message to be transmitted via a set of resources that includes one or more resources that support full-duplex communications, determine a set of multiple available resources of the set of resources for the one or more repetitions of the uplink message based on a quantity of the one or more repetitions of the uplink message and the set of resources, and transmit the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

Another apparatus for wireless communication at a UE is described. The apparatus may include means for receiving a control message indicating a frequency hopping configuration for one or more repetitions of an uplink message, the one or more repetitions of the uplink message to be transmitted via a set of resources that includes one or more resources that support full-duplex communications, means for determining a set of multiple available resources of the set of resources for the one or more repetitions of the uplink message based on a quantity of the one or more repetitions of the uplink message and the set of resources, and means for transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

A non-transitory computer-readable medium storing code for wireless communication at a UE is described. The code may include instructions executable by a processor to receive a control message indicating a frequency hopping configuration for one or more repetitions of an uplink message, the one or more repetitions of the uplink message to be transmitted via a set of resources that includes one or more resources that support full-duplex communications, determine a set of multiple available resources of the set of resources for the one or more repetitions of the uplink message based on a quantity of the one or more repetitions of the uplink message and the set of resources, and transmit the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

Some examples of the method, apparatuses, and non-transitory computer-readable medium described herein may further include operations, features, means, or instructions for determining that a subset of resources of the set of resources may be unavailable for the one or more repetitions of the uplink message based on the set of resources and an FDRA associated with the one or more repetitions of the uplink message and dropping respective transmissions of the one or more repetitions of the uplink message based on the subset of resources being unavailable.

In some examples of the method, apparatuses, and non-transitory computer-readable medium described herein, determining the set of multiple available resources may include operations, features, means, or instructions for determining that each available resource of the set of multiple available resources may be available in a time domain for the one or more repetitions of the uplink message based on a quantity of symbol periods associated with each transmission of the one or more repetitions of the uplink message.

In some examples of the method, apparatuses, and non-transitory computer-readable medium described herein, determining the set of multiple available resources may include operations, features, means, or instructions for determining the set of multiple available resources based on a format of the one or more repetitions of the uplink message.

In some examples of the method, apparatuses, and non-transitory computer-readable medium described herein, where respective resources of the set of multiple available resources may be determined based on a respective slot index, and where a first available resource of the set of multiple available resources corresponds to a first frequency hop of the frequency hopping pattern and a second available resource of the set of multiple available resources corresponds to a second frequency hop of the frequency hopping pattern.

In some examples of the method, apparatuses, and non-transitory computer-readable medium described herein, the frequency hopping configuration corresponds to inter-slot frequency hopping for the one or more repetitions of the uplink message.

In some examples of the method, apparatuses, and non-transitory computer-readable medium described herein, the set of multiple available resources may be determined based on a slot format for respective resources of the set of resources.

In some examples of the method, apparatuses, and non-transitory computer-readable medium described herein, the slot format indicates whether a slot supports the full-duplex communications.

A method for wireless communication at a UE is described. The method may include receiving a control message indicating a frequency hopping configuration for one or more repetitions of an uplink message, the one or more repetitions of the uplink message to be transmitted via a set of resources that includes one or more resources that support full-duplex communications, determining a frequency hopping pattern based on the frequency hopping configuration and the set of resources, determining a set of multiple available resources of the set of resources for the one or more repetitions of the uplink message based on the frequency hopping pattern, and transmitting the uplink message and the one or more repetitions of the uplink message using the set of multiple available resources and the frequency hopping pattern.

An apparatus for wireless communication at a UE is described. The apparatus may include a processor, and a memory coupled with the processor, wherein the memory comprises instructions executable by the processor to cause the apparatus to receive a control message indicating a frequency hopping configuration for one or more repetitions of an uplink message, the one or more repetitions of the uplink message to be transmitted via a set of resources that includes one or more resources that support full-duplex communications, determine a frequency hopping pattern based on the frequency hopping configuration and the set of resources, determine a set of multiple available resources of the set of resources for the one or more repetitions of the uplink message based on the frequency hopping pattern, and transmit the uplink message and the one or more repetitions of the uplink message using the set of multiple available resources and the frequency hopping pattern.

Another apparatus for wireless communication at a UE is described. The apparatus may include means for receiving a control message indicating a frequency hopping configuration for one or more repetitions of an uplink message, the one or more repetitions of the uplink message to be transmitted via a set of resources that includes one or more resources that support full-duplex communications, means for determining a frequency hopping pattern based on the frequency hopping configuration and the set of resources, means for determining a set of multiple available resources of the set of resources for the one or more repetitions of the uplink message based on the frequency hopping pattern, and means for transmitting the uplink message and the one or more repetitions of the uplink message using the set of multiple available resources and the frequency hopping pattern.

A non-transitory computer-readable medium storing code for wireless communication at a UE is described. The code may include instructions executable by a processor to receive a control message indicating a frequency hopping configuration for one or more repetitions of an uplink message, the one or more repetitions of the uplink message to be transmitted via a set of resources that includes one or more resources that support full-duplex communications, determine a frequency hopping pattern based on the frequency hopping configuration and the set of resources, determine a set of multiple available resources of the set of resources for the one or more repetitions of the uplink message based on the frequency hopping pattern, and transmit the uplink message and the one or more repetitions of the uplink message using the set of multiple available resources and the frequency hopping pattern.

In some examples of the method, apparatuses, and non-transitory computer-readable medium described herein, determining the set of multiple available resources may include operations, features, means, or instructions for determining that each available resource of the set of multiple available resources may be available in a time domain and a frequency domain for the one or more repetitions of the uplink message based on the frequency hopping configuration.

In some examples of the method, apparatuses, and non-transitory computer-readable medium described herein, respective resources of the set of multiple available resources determined based on a respective slot index, and where a first available resource of the set of multiple available resources corresponds to a first frequency hop of the frequency hopping pattern and a second available resource of the set of multiple available resources corresponds to a second frequency hop of the frequency hopping pattern that may be different from the first frequency hop.

In some examples of the method, apparatuses, and non-transitory computer-readable medium described herein, the frequency hopping configuration corresponds to inter-slot frequency hopping for the one or more repetitions of the uplink message.

In some examples of the method, apparatuses, and non-transitory computer-readable medium described herein, the set of multiple available resources may be determined based on a slot format for respective resources of the set of resources.

In some examples of the method, apparatuses, and non-transitory computer-readable medium described herein, the slot format indicates whether a slot supports the full-duplex communications.

DETAILED DESCRIPTION

Figure 1:
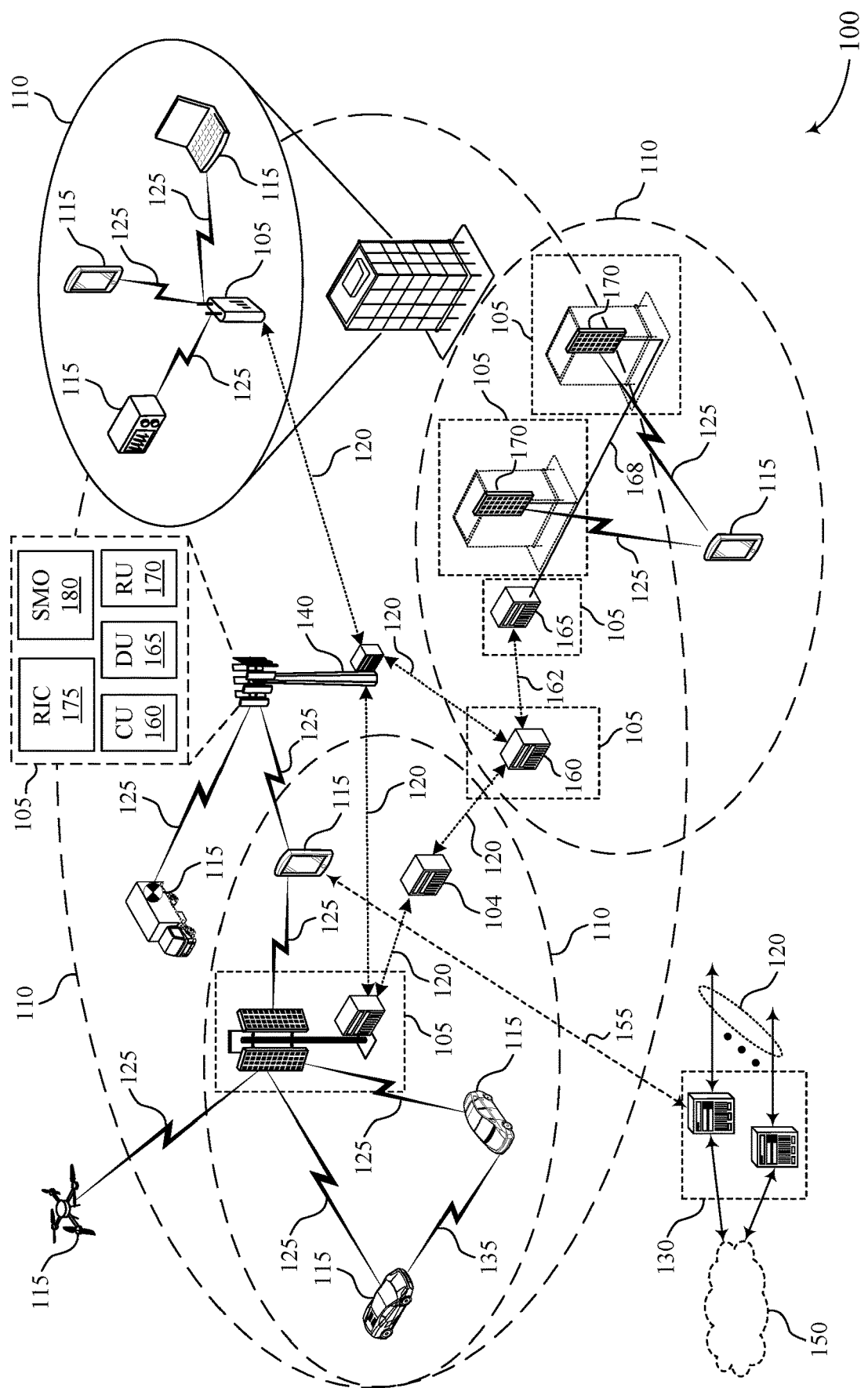
FIG. 1 illustrates an example of a wireless communications system that supports frequency hopping and available slot determination for full-duplex operation in accordance with one or more aspects of the present disclosure.

In some wireless communications systems, a user equipment (UE) may transmit uplink messages using resources configured for full-duplex operation (e.g., sub-band full-duplex (SBFD) resources). Full-duplex operation may enable the UE to use multiple channels in a same band for simultaneous transmission and reception. That is, full-duplex communications may refer to a device concurrently transmitting and receiving messages via some time-frequency resources. Here, the resources may overlap in the time domain and may further be separate or at least partially overlap in the frequency domain. In some examples, when frequency hopping (e.g., inter-slot frequency hopping) is enabled, a UE may identify a first, standalone resource that is available for transmitting an uplink message. The UE may determine a frequency hopping pattern based on a relative resource index (e.g., a relative slot index) of the first resource and for subsequent resources following the first resource for one or more repetitions of the uplink message. The frequency hopping pattern may include a sequence of frequency hops.

However, if the full-duplex (e.g., SBFD) operation is enabled, the availability of some resources may change based on a combination of the full-duplex communications and frequency hopping performed by the UE. For example, while an uplink resource, which may be in a full-duplex slot, may be available in a time domain, frequency hopping may negate the availability of that same resource in a frequency domain (e.g., due to the presence of downlink resources in the same slot). As such, the UE may be unable to determine which resources are available for one or more repetitions of an uplink message or what frequency hopping pattern to use to transmit the repetitions when SBFD operation is enabled. Without revising how the repetitions are transmitted using SBFD resources (e.g., without determining which slots may be used for these transmissions), the efficiency and quality of communications between the UE and a network entity may decrease.

The techniques described herein support determining available resources and frequency hopping patterns when a UE is to transmit repetitions of an uplink message (e.g., across multiple slots) using at least some resources configured for SBFD operation. In some examples, when SBFD operation is enabled, the UE may determine one or more available resources (e.g., slots) before determining a frequency hopping pattern for transmitting one or more repetitions of an uplink message. For example, the UE may receive a control message indicating a frequency hopping configuration for repetitions of an uplink message that the UE is to transmit via a set of resources. Some resources of the set of resources may be configured for SBFD operation (e.g., may include downlink and uplink resources). The UE may determine that one or more resources (e.g., slots) of the set of resources are available, and accordingly, may transmit the uplink message and the repetitions of the uplink message via the one or more available resources and based on a frequency hopping pattern, where the UE may determine the frequency hopping pattern based on the available resources and the frequency hopping configuration. That is, the UE may first determine a set of two or more available slots for transmitting the uplink message and the corresponding repetitions, then the UE may determine the hopping pattern based on the set of available slots, where the available slots and the hopping pattern may be determined via independent processes. Alternatively, the UE may first determine the hopping pattern and a hopping index associated with a given slot, and the UE may then determine a set of two or more available slots for transmitting the uplink message and the corresponding repetitions. In some examples, each frequency hop of the frequency hopping pattern may depend on a different available resource. In some cases, the UE may drop a transmission of a repetition if a frequency-domain resource allocation (FDRA) for one or more available resources is unavailable due to the SBFD operation.

Aspects of the subject matter described herein may be implemented to realize one or more of the following potential improvements, among others. The techniques employed by the described network devices (e.g., UEs, network entities) may enable the UE to perform available resource (e.g., slot) determination and frequency hopping when SBFD operation is enabled, which may increase resource efficiency. That is, determining a frequency hopping pattern based on available resources may ensure that available resources are used for frequency hopping efficiently, and that the UE is transmitting uplink messages in available slots, resulting in relatively fewer failed transmissions. As such, the described techniques may improve communications between the UE and the network entity, among other benefits.

Aspects of the disclosure are initially described in the context of wireless communications systems. Aspects of the disclosure are then described in the context of frequency hopping configurations and process flows. Aspects of the disclosure are further illustrated by and described with reference to apparatus diagrams, system diagrams, and flowcharts that relate to frequency hopping and available slot determination for full-duplex operation.

FIG. 1 illustrates an example of a wireless communications system 100 that supports frequency hopping and available slot determination for full-duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support frequency hopping and available slot determination for full-duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems 100 may support half-duplex communications, in which a UE 115 and a network entity 105 may transmit and receive uplink and downlink communications via separate frequency bands. For example, if a network entity 105 is engaging in downlink communications, the network entity 105 may filter out any signaling that is incoming from a UE 115 via an uplink band. Additionally, or alternatively, the wireless communications system 100 may support full-duplex communications in time domain division (TDD) bands. Full-duplex communications in TDD bands may increase an uplink duty cycle, which may result in latency improvements for access and IAB links as well as improvements to uplink coverage. In addition, full-duplex communications in TDD bands may enhance system capacity, and enable flexible and dynamic uplink and downlink resource adaptation according to uplink and downlink traffic, which may solve particular challenges of TDD communications.

In some examples, the wireless communications system 100 may support SBFD communications, in which a UE 115 and a network entity 105 may perform simultaneous transmission and reception of downlink and uplink communications on a frequency sub-band basis (e.g., across a set of frequencies). For example, the network entity 105 may partition a particular band (e.g., 100 MHz) into sub-bands which may be used exclusively for uplink or downlink communications. For example, 40 MHz of a 100 MHz band may be used for downlink communications, 20 MHz may be used for uplink communications, and another 40 MHz may be used for downlink communications. That is, the uplink and downlink bands may have relatively similar frequencies, however, may be non-overlapping in frequency. SBFD communications may be suitable for macro cells with a relatively large transmit power and may be relatively simpler to enable than other full-duplex techniques. In addition, SBFD communications may improve latency and increase uplink coverage via FDD in TDD bands.

To further enhance flexibility of some operations, the wireless communications system 100 may support network entities 105, UEs 115, or both that may perform simultaneous transmission and reception of downlink and uplink communications via partially or fully overlapping frequency bands. For example, the wireless communications system 100 may support a UE 115 and a network entity 105 that operate using full-duplex communications via partially overlapping frequency bands, or a network entity 105 that operates using half-duplex communications (e.g., in a multi-TRP (mTRP)) scenario) and a UE 115 that operates using SBFD communications.

In a TDD scenario, network entities 105 in the wireless communications system 100 may support SBFD operations (e.g., where uplink and downlink sub-bands are non-overlapping in frequency), while UEs 115 may support half-duplex communications. For example, the network entity 105 may use a particular sub-band for transmitting downlink communications to a first UE 115, and a particular sub-band for receiving simultaneous uplink communications from a second UE 115. As such, a UE 115 capable of half-duplex communications may be paired with any network entity 105 capable of SBFD operations in the wireless communications system 100.

In some examples, the network entity 105 may use in-band full-duplex (IBFD) communications, in which the network entity 105 may transmit and receive communications with a UE 115 via a same time resource and a same frequency resource. That is, the downlink and uplink may share same IBFD time and frequency resources, which may partially or fully overlap. Similarly, a UE 115 and network entity 105 may communicate using single-frequency full-duplex (SFFD) communications, which may enable simultaneous uplink and downlink transmissions on the same frequency resources (e.g., fully overlapping frequency and time resources). SFFD operations may enhance the flexibility of system operation, and such operations may be supported based on one or more conditions being satisfied, such as when a relatively large spatial isolation is achieved. Here, communications may fall back to FDM and/or SDM operation when the conditions are not satisfied. Additionally, or alternatively, the network entity 105 may use sub-band FDD (e.g., flexible duplex) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

In addition, the wireless communications system 100 may support demodulation reference signal (DMRS) bundling across multiple physical uplink shared channel (PUSCH) and physical uplink control channel (PUCCH) repetitions when SBFD operation is enabled. DMRS bundling may occur when a same DMRS is transmitted across multiple slots, where a network entity 105 may bundle the DMRSs to identify an underlying channel across the multiple slots for performing joint channel estimation across the multiple slots (e.g., joint channel estimation using DMRS symbols transmitted across various slots). A framework for the PUSCH repetitions may correspond to a Type A repetition scheme, a Type B repetition scheme, or transport block processing over multi-slot PUSCH (TBoMS). In some examples, DMRS bundling across different transport blocks may be unsupported. In addition, the DMRS bundling may be across consecutive slots, and across non-back-to-back PUSCH repetitions (e.g., where gaps smaller than 14 symbols may occur).

In a DMRS bundling procedure, a UE 115 may determine a set of nominal DMRS bundles based on a configured time domain window (TDW) duration. That is, a network entity 105 may configure the UE 115 to bundle DMRS transmissions across a given quantity of slots. For example, the UE 115 may transmit a total of four PUSCH repetitions, and the network entity 105 may configure the UE 115 to bundle each pair of PUSCH repetitions based on a TDW of two slots (e.g., a first nominal bundle may include first and second PUSCH repetitions, and a second nominal bundle may include third and fourth PUSCH repetitions).

Upon determining the set of nominal DMRS bundles, the UE 115 may determine one or more bundles within each nominal TDW (e.g., that spans k slots). During a nominal TDW (e.g., a bundle), one or more events may occur that may lead to a change in phase continuity or power consistency. The one or more events may include intervening uplink transmissions (e.g., the UE 115 may pause PUSCH transmissions to transmit a different message), timing advance commands, downlink reception and monitoring (e.g., the UE 115 may pause PUSCH transmissions to receive a downlink message), or the like. As such, the UE 115-a may divide each nominal bundle into multiple smaller bundles. Put another way, the UE 115-a may divide the nominal TDW into multiple actual TDWs (e.g., sub-bundles). After an event is completed, the UE 115 may resume bundling in a subsequent slot. For example, if the four PUSCH repetitions are transmitted within the nominal TDW, the UE 115 may bundle the first and second PUSCH repetitions to form a first actual TDW, and the UE 115 may bundle the third and fourth PUSCH repetitions to form a second actual TDW, where an event may have occurred between the first and second actual TDWs.

In some examples, the UE 115 may utilize PUCCH inter-slot frequency hopping to improve communications with the network entity 105. The UE 115 may use the PUCCH inter-slot frequency hopping if a PUCCH transmission is scheduled with repetitions, where the UE 115 may transmit multiple PUCCH repetitions in multiple slots.

Instead of using a resource allocation in frequency across all of the PUCCH repetitions, the UE 115 may configure the PUCCH repetitions to hop across different resource allocations using the PUCCH inter-slot frequency hopping. In some examples, the UE 115 may transmit the PUCCH repetitions based on a set of slots available to the UE 115 for transmitting the PUCCH repetitions. For example, once the UE 115 receives a grant indicating that the UE 115 is to transmit the PUCCH with or without repetitions, the UE 115 may identify the set of available slots, which may include slots available for a PUCCH transmission (e.g., slots that have enough resources open and configured to carry an uplink transmission). As such, the UE 115 may determine a frequency hopping pattern (e.g., an inter-slot frequency hopping pattern) based on relative slot indices corresponding to the available slots (e.g., the UE 115 may determine the set of available slots first, and then determine the frequency hopping pattern and define hops based on the relative slot indices corresponding to the available slots). In some examples, the frequency hopping pattern may include alternating between a first hop and a second hop for each consecutive relative slot index.

In some cases, the UE 115 may perform available slot determination and frequency hopping pattern determination for the PUCCH repetitions. For example, the UE 115 may determine a first slot that is available for transmitting a PUCCH repetition. The UE 115 may assign relative slot indices to consecutive slots after the first slot, and determine the frequency hopping pattern based on the relative slot indices. That is, once the UE 115 determines the first slot, the UE 115 may determine the frequency hopping pattern based on the first slot but independent of available slot determination for the remaining PUCCH repetitions. In some examples, for multiple PUCCH repetitions, the UE 115 may check resource availability for time-domain resources, but the UE 115 may not consider resource availability of frequency-domain resources.

The wireless communications system 100 may support determining available resources and frequency hopping patterns when a UE 115 is to transmit repetitions of uplink messages using resources configured for SBFD operation. In some examples, when SBFD operation is enabled, the UE 115 may determine one or more available resources (e.g., slots) before determining a frequency hopping pattern for transmitting one or more uplink messages. For example, the UE 115 may receive a control message indicating a frequency hopping configuration for one or more repetitions of an uplink message that the UE 115 is to transmit via a set of resources. At least some resources of the set of resources may be configured for SBFD operation (e.g., may include downlink and uplink resources). The UE 115 may determine that one or more resources of the set of resources are available (e.g., the UE 115 may identify the available resources from the set of resources), and accordingly, the UE 115 may transmit the uplink message and the one or more repetitions of the uplink message via the one or more available resources and based on a frequency hopping pattern, where the UE 115 may determine the frequency hopping pattern based on the available resources and the frequency hopping configuration. In some examples, each frequency hop of the frequency hopping pattern may depend on a different available resource. In some cases, the UE 115 may drop a repetition of the uplink message if an FDRA for one or more available resources is unavailable due to the SBFD operation.

Additionally, or alternatively, when SBFD operation is enabled, the UE 115 may determine the frequency hopping pattern before determining the available resources. In such cases, the available resources may be determined based on both time-domain availability and frequency-domain availability. In such cases, the UE 115 may determine the available resources based on a known resource assignment or resource configuration. In some examples, available resources for uplink transmissions may be determined based on both time-domain and frequency-domain availability when frequency hopping is enabled or when frequency hopping is disabled.

Figure 2:
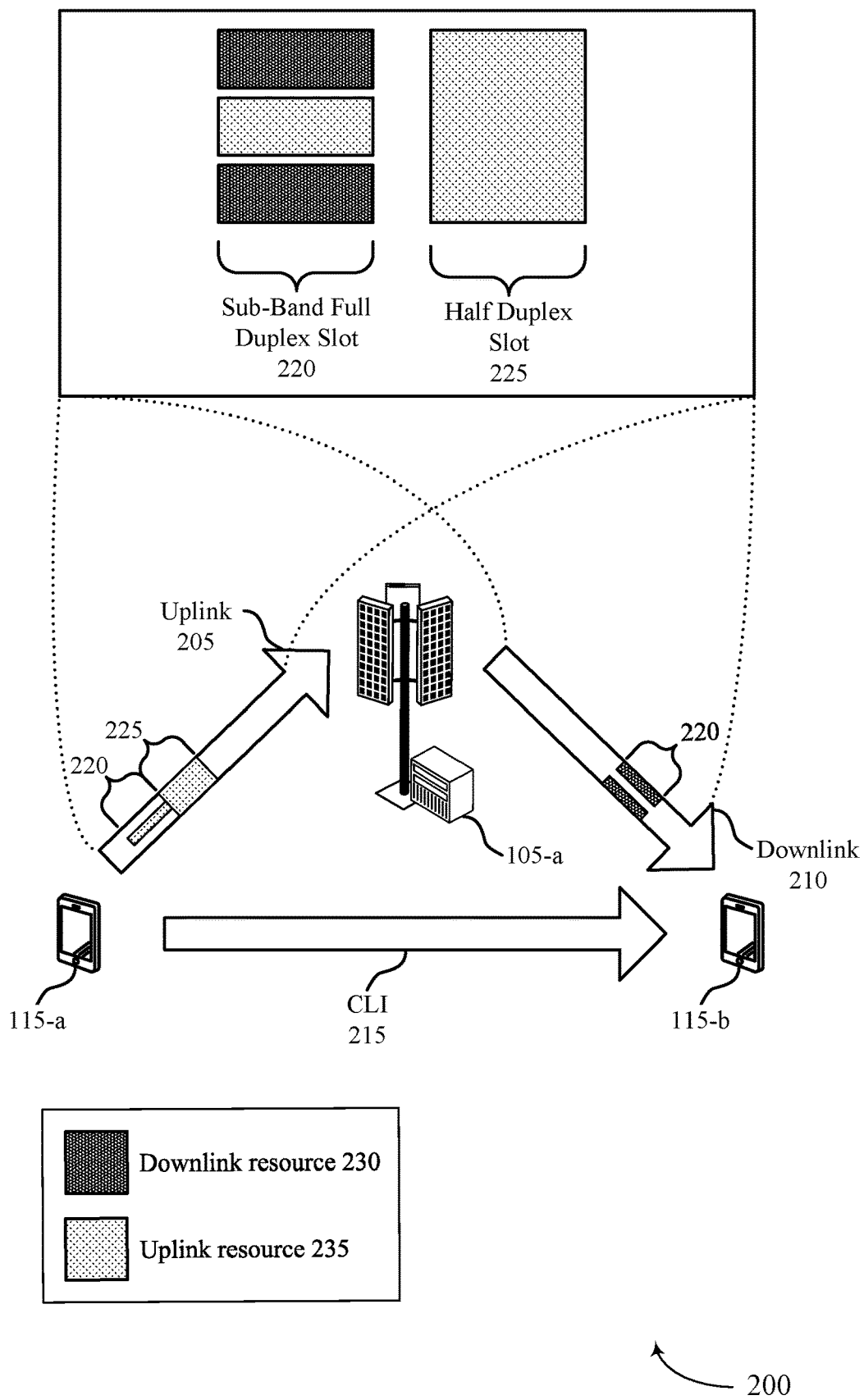
FIG. 2 illustrates an example of a wireless communications system that supports frequency hopping and available slot determination for full-duplex operation in accordance with one or more aspects of the present disclosure.

FIG. 2 illustrates an example of a wireless communications system 200 that supports frequency hopping and available slot determination for full-duplex operation in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a*, a UE 115-*b*, and a network entity 105-*a*, which may be examples of corresponding devices described herein. In some examples, the UEs 115 and the network entity 105-*a* may support frequency hopping and available slot determination for full-duplex operation (e.g., SBFD operation), which may increase the efficiency and reliability of communications in the wireless communications system 200.

The wireless communications system 200 may support communications between the UEs 115 and the network entity 105-*a*, where the UE 115-*a* and the UE 115-*b* may use half-duplex operation (e.g., the UEs 115 may receive downlink messages or transmit uplink messages at a given time), and the network entity 105-*a* may use full-duplex operation (e.g., the network entity 105-*a* may receive uplink messages and transmit downlink messages simultaneously). For example, the UE 115-*a* may transmit uplink messages (e.g., an uplink message and one or more repetitions of the uplink message, two or more transmissions of a same uplink message across multiple slots) to the network entity 105-*a* via an uplink 205, and the UE 115-*b* may receive downlink messages from the network entity 105-*a* via a downlink 210. The uplink 205 and the downlink 210 may be examples of communication links 125 described with reference to FIG. 1. In addition, the UE 115-*a* and the UE 115-*b* may experience cross link interference (CLI) 215 (e.g., UE-to-UE interference), which may be caused by a traffic imbalance between the uplink 205 and the downlink 210 in adjacent cells.

In some cases, the UEs 115 and the network entity 105-*a* may communicate uplink and downlink messages using a full-duplex slot 220 (e.g., an SBFD slot, a slot including time-frequency resources configured for full-duplex communications) and a half-duplex slot 225. The full-duplex slot 220 may include a first subband configured for downlink transmissions (e.g., a downlink resource 230), a second subband configured for uplink transmissions (e.g., an uplink resource 235), and a third subband also configured for downlink transmissions (e.g., a downlink resource 230), where the subbands are non-overlapping. The uplink and downlink subbands in the full-duplex slot 220 may enable the network entity 105-*a* to communicate with both the UE 115-*a* via the uplink 205 and the UE 115-*b* via the downlink 210. For example, the UE 115-*a* may communicate with the network entity 105-*a* via the uplink 205 and using the half-duplex slot 225, which may include an uplink resource 235 configured to carry uplink messages. In addition, the UE 115-*a* may communicate with the network entity 105-*a* via the uplink 205 and using an uplink resource 235 (e.g., the second subband of the full-duplex slot 220 that is configured for uplink transmissions). As such, the UE 115-*a* may just communicate with the network entity 105-*a* via only the uplink 205. In some cases, the UE 115-*b* may additionally communicate with the network entity 105-*a* via the downlink 210 and using downlink resources 230 (e.g., the first and third subbands of the full-duplex slot 220 that are configured for downlink transmissions). As such, the UE 115-*b* may communicate with the network entity 105-*a* via only the downlink 210.

In some examples, the wireless communications system 200 may support frequency hopping and available slot determination for full-duplex (e.g., SBFD) operation. In some examples, the UE 115-*a* may receive a control message indicating a frequency hopping configuration (e.g., an interslotFrequencyHopping field within PUCCH-Config or PUSCH-Config, which may enable inter-slot frequency hopping for one or more PUCCH or PUSCH formats repeated over multiple slots) for one or more repetitions of an uplink message, which are to be transmitted by the UE 115-*a* and via a set of multiple resources. The frequency hopping configuration is described herein with reference to FIGS. 3 through 7. In some examples, the set of multiple resources may include one or more slots that enable the UE 115-*a* to communicate using full-duplex operation (e.g., the full-duplex slot 220), via the downlink 210 (e.g., downlink slots), via the uplink 205 (e.g., uplink slots), via the downlink 210 and the uplink 205 (e.g., special or split slots), or any combination thereof. In a special or split slot, time-domain resources may be divided for downlink and uplink communications. In some examples, the UE 115-*a* may be configured to transmit the one or more repetitions of the uplink message via the uplink subband of the full-duplex slot 220.

In some cases, the UE 115-*a* may first determine a set of available slots for transmitting the two or more transmissions of the uplink message, and then the UE 115-*a* may determine a frequency hopping pattern. That is, the available slot determination may have precedence over frequency hopping pattern determination. The UE 115-*a* may determine that one or more resources (e.g., slots) of the set of multiple resources are available for the two or more transmissions of the uplink message based on a quantity of the two or more transmissions of the uplink message and the set of multiple resources. For example, the UE 115-*a* may determine the available resources only based on time-domain resource availability. Additionally, or alternatively, how many repetitions of the uplink message are to be transmitted may impact how many resources are available.

The UE 115-*a* may transmit the two or more transmissions of the uplink message to the network entity 105-*a* using a frequency hopping pattern. The UE 115-*a* may determine the frequency hopping pattern based on the set of available resources and in accordance with the frequency hopping configuration. In addition, the frequency hopping pattern may include two or more frequency-domain resources that each correspond to respective available resources. For example, the frequency hopping pattern may include two or more different frequency hops on available resources based on a time domain resource allocation (TDRA) of the available resources.

In some examples, when performing the available slot determination, the UE 115-*a* may identify available slots based on a TDRA. In some cases, frequency-domain resources may be unavailable in the identified set of available resources. If an FDRA is unavailable in a slot that is identified as available for the transmission(s) of the uplink message because of the full-duplex operation in the wireless communications system 200, the UE 115-*a* may drop a transmission of the uplink message (e.g., a repetition of a PUCCH transmission) in that slot, and the UE 115-*a* may refrain from replacing the dropped uplink message. For example, the UE 115-*a* may determine that a subset of the set of available resources is unavailable for two or more transmissions of the uplink message based on an FDRA associated with the two or more transmissions of the uplink message. The UE 115-*a* may drop respective transmissions of the uplink message based on the subset of resources being unavailable. Dropping a transmission of the uplink message based on the unavailability of frequency-domain resources is described with reference to FIG. 4.

By determining a set of available resources for transmitting an uplink message and corresponding repetitions before determining a frequency hopping pattern when SBFD operation is enabled, the UE 115-*a* or the UE 115-*b* may improve communications with the network entity 105-*a*. For example, performing available slot determination for full-duplex slots 220 may increase resource efficiency as a UE 115 may increase the utilization of each full-duplex slot 220 (e.g., which each include subbands for uplink or downlink communications). Additionally, determining a frequency hopping pattern based on the available slots may further increase resource utilization efficiency as respective hops in the frequency hopping pattern may utilize the available slots. In some cases, the UE 115-*a* may determine that a full-duplex slot 220 (e.g., a SBFD slot) is available for the uplink message based on a TDRA, however, based on a particular FDRA associated with a first hop, some resources may be unavailable because of SBFD operation. As such, the UE 115-*a* may attempt to accommodate a second hop. If resources used for the second hop are unavailable, the UE 115-*a* may drop the associated uplink message and corresponding repetitions, which may result in more efficient resource utilization and reduced failed transmissions, among other benefits.

Figure 3:
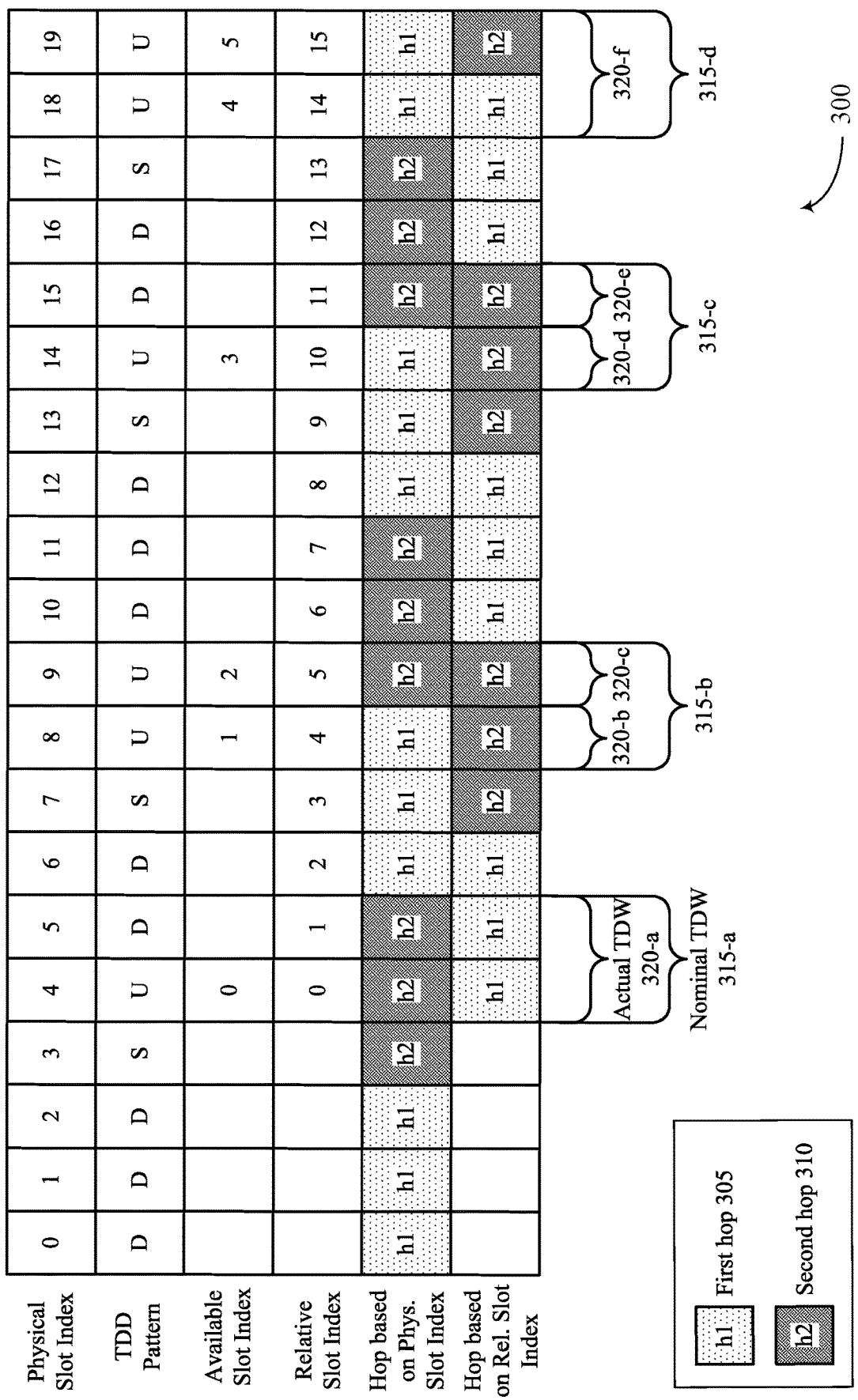
FIGS. 3 through 7 illustrate examples of frequency hopping configurations that support frequency hopping and available slot determination for full-duplex operation in accordance with one or more aspects of the present disclosure.

FIG. 3 illustrates an example of a frequency hopping configuration 300 that supports frequency hopping and available slot determination for full-duplex operation in accordance with one or more aspects of the present disclosure. In some examples, the frequency hopping configuration 300 may be implemented by aspects of the wireless communications systems 100 and 200. For example, a UE may use the frequency hopping configuration 300 to determine one or more frequency hopping patterns. In addition, the UE may use the frequency hopping configuration 300 to perform available slot determination, DMRS bundling, or both, which may increase resource efficiency and improve communications between the UE and a network entity, among other benefits.

In some examples, a frequency hopping pattern (e.g., an inter-slot frequency hopping pattern) may enable a UE to communicate messages with a network entity using changing frequency resources in a particular pattern. As described herein, the UE may receive a control message (e.g., an RRC message) indicating the frequency hopping configuration 300 for two or more transmissions of an uplink message (e.g., one or more repetitions of the uplink message). The UE may be configured to transmit the uplink message to the network entity via a set of multiple resources (e.g., slots) that include one or more full-duplex slots (e.g., SBFD slots). The UE may determine that some resources of the set of multiple resources are available for the uplink message. In some cases, the UE may use the available resources and the frequency hopping configuration 300 to determine a frequency hopping pattern, which the UE may use for transmitting the uplink message and a quantity of repetitions of the uplink message to the network entity. Additionally, or alternatively, the UE may determine the frequency hopping pattern before determining the available resources for one or more uplink transmissions based on the frequency hopping configuration 300. In some examples, in determining the frequency hopping pattern, the UE may assign a hop index to each repetition of the uplink message based on a slot index, a relative slot index, or a repetition index, among other examples.

In some cases, the frequency hopping configuration 300 may indicate a set of twenty physical slot indices ranging from a physical slot index of 0 to a physical slot index of 19, where the frequency hopping configuration 300 may span 30 kHz. In addition, the frequency hopping configuration 300 may indicate a TDD pattern (e.g., a TDD slot pattern) that repeats each ten slots. The TDD pattern may indicate whether a particular slot may be configured for downlink communications, uplink communications, or downlink and uplink communications (e.g., a special slot, a split slot). For example, the TDD pattern for slots corresponding to a slot index 0 to a slot index 9 may include, consecutively, three downlink slots (e.g., "D"), a special slot (e.g., "S"), an uplink slot (e.g., "U"), two downlink slots, a special slot, and two uplink slots.

At some time, the UE may receive an uplink grant to transmit an uplink message (e.g., PUSCH transmission) to the network entity in a slot that is configured for uplink communications (e.g., a slot labeled "U" in the TDD pattern). The UE may perform an available slot determination procedure to determine a set of slots configured for the uplink communications and available for transmitting the uplink message and one or more repetitions of the uplink message. In the example of FIG. 3, each uplink slot may be available for the uplink message transmissions, and as such may be labeled with available slot indices 0, 1, 2, 3, 4, and 5. The available uplink slots may correspond to physical slot indices 4, 8, 9, 14, 18, and 19, respectively.

Beginning from the first uplink slot that is identified as available (e.g., the slot associated with the physical slot index 4 and the available slot index 0), the frequency hopping configuration 300 may indicate a relative slot index for each following slot. For example, the first available uplink slot may correspond to a relative slot index 0, and additional uplink slots that are available may correspond to increments of the available slot index based on the first available uplink slot. Further, each subsequent slot after the first available uplink slot (e.g., including downlink, special, and uplink slots) may correspond to consecutive relative slot indices 0 through 15. As such, the slot associated with the physical slot index 4, and each slot after the slot associated with the physical slot index 4, may correspond to a physical slot index and a relative slot index. The physical slot indices, the TDD pattern, the available slot indices, and the relative slot indices may provide a basic structure of the frequency hopping configuration 300 based on the available slot determination procedure.

In some examples, the frequency hopping configuration 300 may indicate one or more inter-slot frequency hopping patterns based on the physical slot indices, the relative slot indices, or both, which may be independent of DMRS bundling. Each frequency hopping pattern may include one or more first hops 305 and one or more second hops 310, where a slot for a given hop is continuous. In addition, a network entity may configure a frequency hopping duration via RRC signaling. In some examples, the UE may use the frequency hopping pattern based on the physical slot indices to transmit PUSCHs, and the frequency hopping pattern based on the relative slot indices to transmit PUCCHs.

Using a given frequency hopping pattern, the UE may switch between two different resource block allocations (e.g., hops) to transmit the repetitions of the uplink message to the network entity. The frequency hopping pattern based on the physical slot indices may indicate that the UE is to alternate between using the first hop 305 (e.g., h1) and the second hop 310 (e.g., h2) in sets of three slots beginning at the slot corresponding to the physical slot index 0, where an associated frequency hopping duration may be set to some duration (e.g., three slots in the present example). For example, the frequency hopping pattern based on the physical slot indices may indicate that the UE is to use the first hop 305 for a first set of three slots (e.g., corresponding to slot indices 0, 1, and 2), the second hop 310 for a second set of three slots (e.g., corresponding to slot indices 3, 4, and 5), the first hop 305 for a third set of three slots (e.g., corresponding to slot indices 6, 7, and 8) and so on for all of the slots included in the frequency hopping configuration 300.

Alternatively, the frequency hopping pattern based on the relative slot indices may indicate that the UE is to alternate between using the first hop 305 and the second hop 310 in sets of three slots beginning at the slot corresponding to the relative slot index 0 (e.g., the physical slot index 4), which may be the first available slot. For example, the frequency hopping pattern based on the relative slot indices may indicate that the UE is to use the first hop 305 for a first set of three slots (e.g., corresponding to physical slot indices 4, 5, and 6), the second hop 310 for a second set of three slots (e.g., corresponding to physical slot indices 7, 8, and 9), and so on, for all of the slots included in the frequency hopping configuration 300.

Based on the identified available slots, the network entity may transmit signaling to the UE indicating for the UE to bundle a quantity of DMRSs in a nominal TDW 315 and indicating a configured TDW duration. The UE may attempt to bundle two or more DMRSs in a nominal TDW 315 that has a length (e.g., quantity of slots) equal to the configured TDW duration indicated from the network entity, where the UE may place nominal TDWs 315 independent of a frequency hopping pattern (e.g., the nominal TDWs 315 may apply to the frequency hopping patterns based on the physical slot indices and the relative slot indices). In the example of FIG. 3, because there are at most two consecutive available slots in the frequency hopping configuration 300 (e.g., slots corresponding to physical slot indices 8 and 9, and slots corresponding to physical slot indices 18 and 19), the network entity may indicate a TDW duration of two slots. Accordingly, the UE may attempt to bundle DMRS transmissions in a nominal TDW 315-a (e.g., including slots corresponding to the physical slot indices 4 and 5), a nominal TDW 315-b (e.g., including slots corresponding to the physical slot indices 8 and 9), a nominal TDW 315-c (e.g., including slots corresponding to the physical slot indices 14 and 15), and a nominal TDW 315-d (e.g., including slots corresponding to the physical slot indices 18 and 19). As such, each nominal TDW 315 may include at least one available slot for the uplink message transmissions.

If the UE successfully bundles the DMRS transmissions in a nominal TDW 315, the nominal TDW 315 may be labeled as an actual TDW 320. For example, the UE may successfully bundle DMRSs in the nominal TDW 315-a across the slots corresponding to the physical slot indices 4 and 5, which may also be an actual TDW 320-a. Additionally, or alternatively, while the UE may have intended to bundle DMRSs across the slots corresponding to the physical slot indices 8 and 9 in the nominal TDW 315-b, something may prevent the UE from doing so. For example, the UE may have accommodated a relatively short SRS transmission in the slot corresponding to the physical slot index 8. As the UE is unable to successfully bundle the DMRSs for the slots in the nominal TDW 315-b, the UE may divide the nominal TDW 315-b into two actual TDWs 320, including an actual TDW 320-b corresponding to the physical slot index 8 and an actual TDW 320-c corresponding to the physical slot index 9.

In some cases, the UE may be unable to successfully bundle DMRSs across the slots in the nominal TDW 315-c (e.g., corresponding to the physical slot indices 14 and 15), and as such, the UE may divide the nominal TDW 315-c into two actual TDWs 320, including an actual TDW 320-d corresponding to the physical slot index 14 and an actual TDW 320-e corresponding to the physical slot index 15. Additionally, or alternatively, the UE may successfully bundle DMRSs across the slots in the nominal TDW 315-d, and as such, the nominal TDW 315-d may also be an actual TDW 320-f (e.g., spanning the slots corresponding to the physical slot indices 18 and 19). The actual TDWs 320 may adapt around the first hops 305 and the second hops 310. For example, if two consecutive slots use different hop indices (e.g., a first slot uses the first hop 305, and a second, consecutive slot uses the second hop 310), the UE may terminate a corresponding actual TDW 320 and determine a new actual TDW 320. As such, the UE may bundle various slots in which the UE may transmit PUSCH or PUCCH repetitions.

Figure 4:
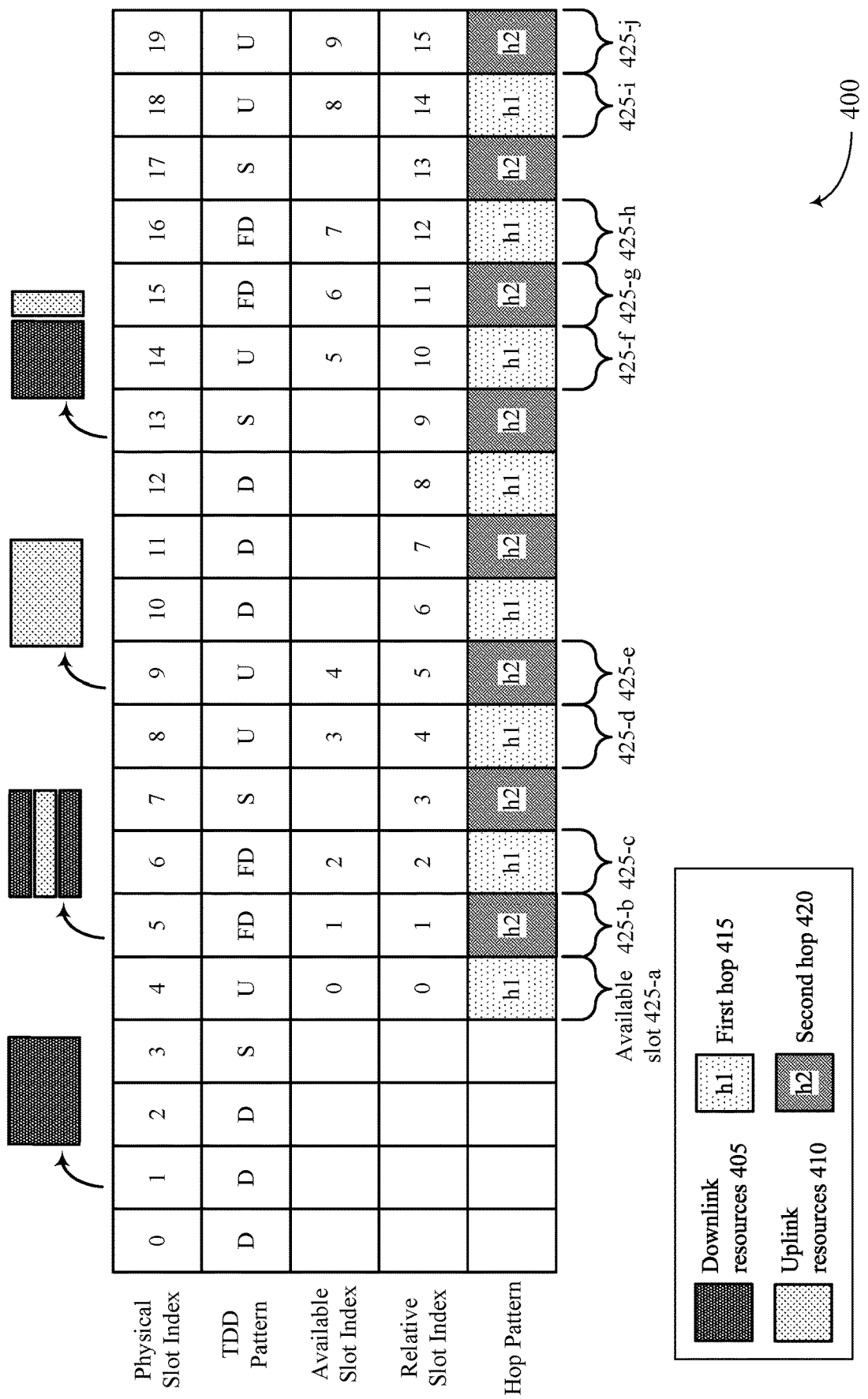

FIG. 4 illustrates an example of a frequency hopping configuration 400 that supports frequency hopping and available slot determination for full-duplex operation in accordance with one or more aspects of the present disclosure. In some examples, the frequency hopping configuration 400 may be implemented by aspects of the wireless communications systems 100 and 200. For example, a UE may use the frequency hopping configuration 400 to determine one or more frequency hopping patterns. In addition, the UE may use the frequency hopping configuration 400 to perform available slot determination, which may increase resource efficiency and improve communications between the UE and a network entity, among other benefits.

As described herein, a UE may determine a set of available resources (e.g., slots) for transmitting one or more repetitions of an uplink message (e.g., PUCCH transmission) to a network entity before determining a frequency hopping pattern to use for transmitting the uplink message and one or more repetitions of the uplink message. For example, the UE may receive a control message from the network entity indicating the frequency hopping configuration 400, the UE may determine a set of two or more available resources, and the UE may determine the frequency hopping pattern based on the set of available resources and in accordance with the frequency hopping configuration 400.

The frequency hopping configuration 400 may indicate twenty physical slot indices ranging from a physical slot index of 0 to a physical slot index of 19. In addition, the frequency hopping configuration 400 may indicate a TDD pattern (e.g., a TDD slot pattern), which may repeat each ten slots. The TDD pattern may indicate whether a particular slot is configured as a downlink slot (e.g., "D") an uplink slot (e.g., "U"), a special or split slot (e.g., "S"), or a full-duplex slot, such as an SBFD slot (e.g., "FD"). A downlink slot may include only downlink resources 405, and an uplink slot may include only uplink resources 410. In addition, a special or split slot may be divided between downlink resources 405 and uplink resources 410 in the time domain, and an SBFD slot may be divided between downlink resources 405 and uplink resources 410 in the frequency domain. For example, a slot corresponding to a physical slot index 1 may be a downlink slot including only downlink resources 405, a slot corresponding to a slot index 5 may be an SBFD slot including some downlink resources 405 and some uplink resources 410 divided in frequency, a slot corresponding to a slot index 9 may be an uplink slot including only uplink resources 410, and a slot corresponding to a slot index 13 may be a special or split slot including some downlink resources 405 and some uplink resources 410 divided in time.

The UE may perform an available slot determination procedure to determine a set of slots that include time-domain resources available for two or more transmissions of an uplink message. For example, if the UE identifies that sufficient time-domain resources are available in a given slot for transmitting the uplink message, the UE may assign an available slot 425 to a corresponding physical slot index. That is, the UE may determine that a set of slots are available in the time domain for one or more repetitions of the uplink message based on a quantity of symbol periods associated with the uplink message. Additionally, or alternatively, the UE may determine that the slots are available based on a format of the uplink message.

In some examples, the UE may identify that an uplink slot corresponding to a physical slot index 4, and SBFD slots corresponding to physical slot indices 5 and 6, each have a sufficient TDRA for transmitting the uplink message. As such, the UE may assign the uplink slot corresponding to the physical slot index 4 as an available slot 425-a (e.g., the first slot available for transmitting the uplink message) with an available slot index 0, the SBFD slot corresponding to the physical slot index 5 as an available slot 425-b, and the SBFD slot corresponding to the physical slot index 6 as an available slot 425-c. In addition, the available slot 425-a may correspond to a relative slot index 0, and each subsequent slot after the available slot 425-a (e.g., including downlink, special, uplink, and SBFD slots) may correspond to consecutive relative slot indices 0 through 15. For example, the available slot 425-b may correspond to a relative slot index 1, the available slot 425-c may correspond to a relative slot index 2, and so on.

In addition, the UE may identify that the uplink and SBFD slots corresponding to physical slot indices 8, 9, 14, 15, 16, 18, and 19 each include sufficient time-domain resources for transmitting the uplink message, and as such, the UE may assign each of the slots as an available slot 425. For example, an available slot 425-d may correspond to the physical slot index 8, an available slot 425-e may correspond to the physical slot index 9, an available slot 425-f may correspond to the physical slot index 14, an available slot 425-g may correspond to the physical slot index 15, an available slot 425-h may correspond to the physical slot index 16, an available slot 425-i may correspond to the physical slot index 18, and an available slot 425-j may correspond to the physical slot index 19. The available slots 425-d, 425-e, 425-f, 425-g, 425-h, 425-i, and 425-j may correspond to available slot indices 3, 4, 5, 6, 7, 8, and 9, respectively.

In some examples, the UE may determine a frequency hopping pattern based on the determining available slots 425. For example, the UE may assign a first hop 415 or a second hop 420 to each available slot 425, which may accommodate the frequency-domain resources used for the first hop 415 or the second hop 420. As DMRS bundling may be disabled, the frequency hopping pattern may alternate the first hop 415 and the second hop 420 in each available slot 425. For example, the available slot 425-a may be assigned the first hop 415, the available slot 425-b may be assigned the second hop 420, the available slot 425-c may be assigned the first hop 415, and so on.

In some cases, frequency-domain resources may be unavailable in the identified set of available slots 425 (e.g., which the UE selected based on the availability of time-domain resources). As such, if an FDRA is unavailable in a slot that is initially identified as available for the uplink message (e.g., because of SBFD operation enabled at the UE), the UE may drop a repetition of the uplink message (e.g., a repetition of a PUCCH) in slot 425, and the UE may refrain from replacing the dropped uplink message.

In the example of FIG. 4, the UE may receive downlink control information (DCI) indicating a downlink grant. The downlink grant may identify a particular uplink resource the UE may use to transmit an uplink message to the network entity. The uplink message may include feedback (e.g., HARQ acknowledgment (ACK) or negative acknowledgment (NACK)). The UE may decode the information carried in the DCI and identify an available slot 425 for transmitting the uplink message. In some examples, the UE may determine which available slot 425 to use based on one or more parameters of the uplink message, including a quantity of symbol periods the uplink message spans (e.g., a length), a format of the uplink message, an FDRA, whether the uplink message may be configured to use inter-slot frequency hopping, or any combination thereof. That is, the UE may infer information about the one or more parameters of the uplink message based on decoding the DCI, and the UE may use the parameter information to determine the available slot 425 based on an TDRA (e.g., and disregarding an FDRA).

Upon determining which available slots 425 to use for transmitting the uplink messages, the UE may determine the frequency hopping pattern with respect to the first available slot (e.g., the available slot 425-a). In some examples, the UE may check whether time domain and frequency-domain resources are available in the available slots 425 such that the UE may successfully transmit the uplink messages. If the frequency-domain resources in an available slot 425 are unavailable, the UE may drop the uplink message transmission in the available slot 425. For example, the UE may determine that the time and frequency-domain resources in the available slot 425-a are available, and as such, the UE may use the available slot 425-a to transmit an uplink message using a first hop 415. Alternatively, the UE may determine that at least the frequency-domain resources in the available slot 425-b and the available slot 425-g are unavailable, and as such, the UE may drop an uplink message transmission in the available slot 425-b and the available slot 425-g. The available slot 425-b and the available slot 425-g may both be SBFD slots (e.g., which may include downlink resources 405 available in the frequency domain, but may include uplink resources 410 used for transmitting uplink messages that are unavailable in the frequency domain).

Figure 5:
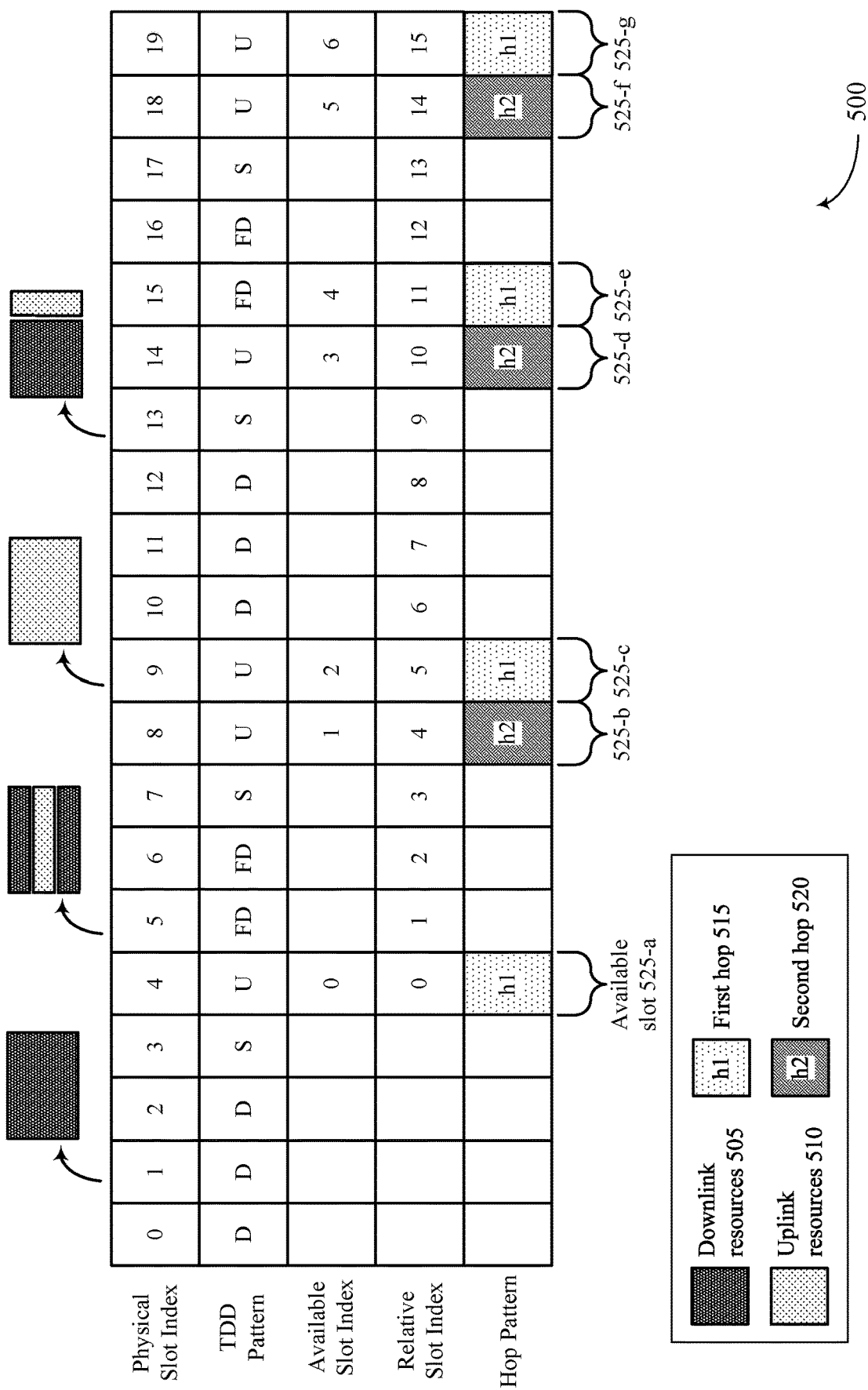

FIG. 5 illustrates an example of a frequency hopping configuration 500 that supports frequency hopping and available slot determination for full-duplex operation in accordance with one or more aspects of the present disclosure. In some examples, the frequency hopping configuration 500 may be implemented by aspects of the wireless communications systems 100 and 200. For example, a UE may use the frequency hopping configuration 500 to determine one or more frequency hopping patterns based on available slot indices and with DMRS bundling disabled. In addition, the UE may use the frequency hopping configuration 500 to perform available slot determination, which may increase resource efficiency and improve communications between the UE and a network entity, among other benefits.

As described herein, a UE may determine a set of available resources (e.g., slots) for transmitting an uplink message and one or more repetitions of the uplink message to a network entity before determining a frequency hopping pattern to use for transmitting the repetitions of the uplink message. For example, the UE may receive a control message from the network entity indicating the frequency hopping configuration 500, the UE may determine a set of available resources, and the UE may determine the frequency hopping pattern based on the set of available resources and in accordance with the frequency hopping configuration 500.

The frequency hopping configuration 500 may indicate twenty physical slot indices ranging from a physical slot index of 0 to a physical slot index of 19. In addition, the frequency hopping configuration 500 may indicate a TDD pattern (e.g., a TDD slot pattern), which may repeat each ten slots. The TDD pattern may indicate whether a particular slot is configured as a downlink slot (e.g., "D") an uplink slot (e.g., "U"), a special or split slot (e.g., "S"), or a full-duplex slot, such as an SBFD slot (e.g., "FD"). A downlink slot may include only downlink resources 505, and an uplink slot may include only uplink resources 510. In addition, a special or split slot may be divided between downlink resources 505 and uplink resources 510 in the time domain, and an SBFD slot may be divided between downlink resources 505 and uplink resources 510 in the frequency domain. For example, a slot corresponding to a physical slot index 1 may be a downlink slot including only downlink resources 505, a slot corresponding to a slot index 5 may be an SBFD slot including some downlink resources 505 and some uplink resources 510 divided in frequency, a slot corresponding to a slot index 9 may be an uplink slot including only uplink resources 510, and a slot corresponding to a slot index 13 may be a special or split slot including some downlink resources 505 and some uplink resources 510 divided in time.

The UE may perform the available slot determination procedure to determine a set of available slots 525 for two or more transmissions of an uplink message (e.g., a set of uplink slots or SBFD slots that include at least some uplink resources 510). In some examples, the UE may identify an uplink slot corresponding to a physical slot index 4, which may be an earliest slot via which the UE may transmit an uplink message (e.g., a PUCCH transmission). The UE may check whether required time and frequency-domain resources are available in the slot. If sufficient time and frequency-domain resources are available in the slot for transmitting the uplink message, the UE may select the slot as an available slot 525-a (e.g., a first available slot 525), and the UE may assign the available slot 525-a an available slot index 0. In addition, the available slot 525-a may correspond to a relative slot index 0, and each subsequent slot after the available slot 525-a (e.g., including downlink, special, uplink, and SBFD slots) may correspond to consecutive relative slot indices 0 through 15.

In some examples, the UE may determine a frequency hopping pattern based on the available slot indices assigned to each available slot 525 (e.g., rather than based on the relative slot indices). For example, UE may select a first slot that is available for two or more transmissions of an uplink message based on the set of available slots 525 and the uplink message, where the first available slot (e.g., the slot 525-*a*) corresponds to a first frequency-domain resource (e.g., a first hop 515) of the frequency hopping pattern. Additionally, the UE may select a second slot that is available for a repetition of the uplink message based on the set of available slots 525 and the uplink message, where the second available slot (e.g., the available slot 525-*b*) corresponds to a second frequency-domain resource (e.g., a second hop 520) of the frequency hopping pattern. The UE may use the available slot 525-*a* and the available slot 525-*b* to transmit the repetition of the uplink message.

As the available slot indices may determine the location of available frequency-domain resources, the UE may continue searching for a next available slot 525 if the frequency-domain resources are unavailable in a desired slot. Put another way, for each individual slot index, the UE may have a desired location for frequency-domain resources before knowing if the frequency-domain resources are indeed available in a given slot. In addition, whether the UE uses a first hop 515 or a second hop 520 in an available slot 525 may be based on the available slot indices.

In the example of FIG. 5, after identifying the available slot 525-*a* and assigning the first hop 515 to the available slot 525-*a* (e.g., based on the time and frequency-domain resources of the available slot 525-*a* accommodating the first hop 515), the UE may check whether each remaining slot included in the frequency hopping configuration 500 (e.g., slots corresponding to physical slot indices 5 through 19 and respective relative slot indices 1 through 15) includes sufficient time and frequency resources for transmitting the uplink message (e.g., repetitions of the uplink message). The UE may check SBFD slots corresponding to physical slot indices 5 and 6, and the UE may determine that frequency-domain resources for the second hop 520 are unavailable in those SBFD slots. As such, the SBFD slots corresponding to the physical slot indices 5 and 6 may be excluded from the set of available slots 525.

Continuing to check the remaining slots for frequency-domain resource availability, the UE may check the uplink slots corresponding to physical slot indices 8 and 9 and identify that sufficient time and frequency-domain resources are available in the uplink slots for transmitting the uplink message. As such, the UE may identify the uplink slot corresponding to the physical slot index 8 as an available slot 525-*b* with an available slot index 1, and the uplink slot corresponding to the physical slot index 9 as an available slot 525-*c* with an available slot index 2. Based on the time and frequency-domain resources of the available slot 525-*b* and the available slot 525-*b* accommodating the second hop 520 and the first hop 515, respectively, the UE may assign the second hop 520 to the available slot 525-*b* and the first hop 515 to the available slot 525-*b*, such that the first hop 515 and the second hop 520 are alternating.

Additionally, the UE may identify that sufficient time and frequency-domain resources are available for transmitting the uplink message using the first hop 515 or the second hop 520 in an uplink slot corresponding to a physical slot index 14 and an SBFD slot corresponding to a physical slot index 15. As such, the UE may identify the uplink slot as an available slot 525-*d* with an available slot index 3, and the SBFD slot as an available slot 525-*e* with an available slot index 4. Based on the time and frequency-domain resources of the available slot 525-*d* and the available slot 525-*d* accommodating the second hop 520 and the first hop 515, respectively, the UE may assign the second hop 520 to the available slot 525-*d* and the first hop 515 to the available slot 525-*d*. In some cases, the UE may check SBFD slot corresponding to physical slot index 16 and may determine that frequency-domain resources for the second hop 520 are unavailable. As such, the SBFD slot corresponding to the physical slot index 16 may be excluded from the set of available slots 525.

In addition, the UE may identify that sufficient time and frequency-domain resources are available for transmitting repetitions of the uplink message using the first hop 515 or the second hop 620 in uplink slots corresponding to a physical slot indices 18 and 19. As such, the UE may identify the uplink slot as an available slot 525-*f* with an available slot index 5, and the SBFD slot as an available slot 525-*g* with an available slot index 6. Based on the time and frequency-domain resources of the available slot 525-*f* and the available slot 525-*g* accommodating the second hop 520 and the first hop 515, respectively, the UE may assign the second hop 520 to the available slot 525-*f* and the first hop 515 to the available slot 525-*g*. As such, the UE may perform a joint search of time and frequency-domain resources in each slot included in the frequency hopping configuration 500, and the UE may use the available slot indices based on the availability of the time and frequency-domain resources to determine locations of the first hops 515 and the second hops 520 in the frequency hopping pattern.

Figure 6:
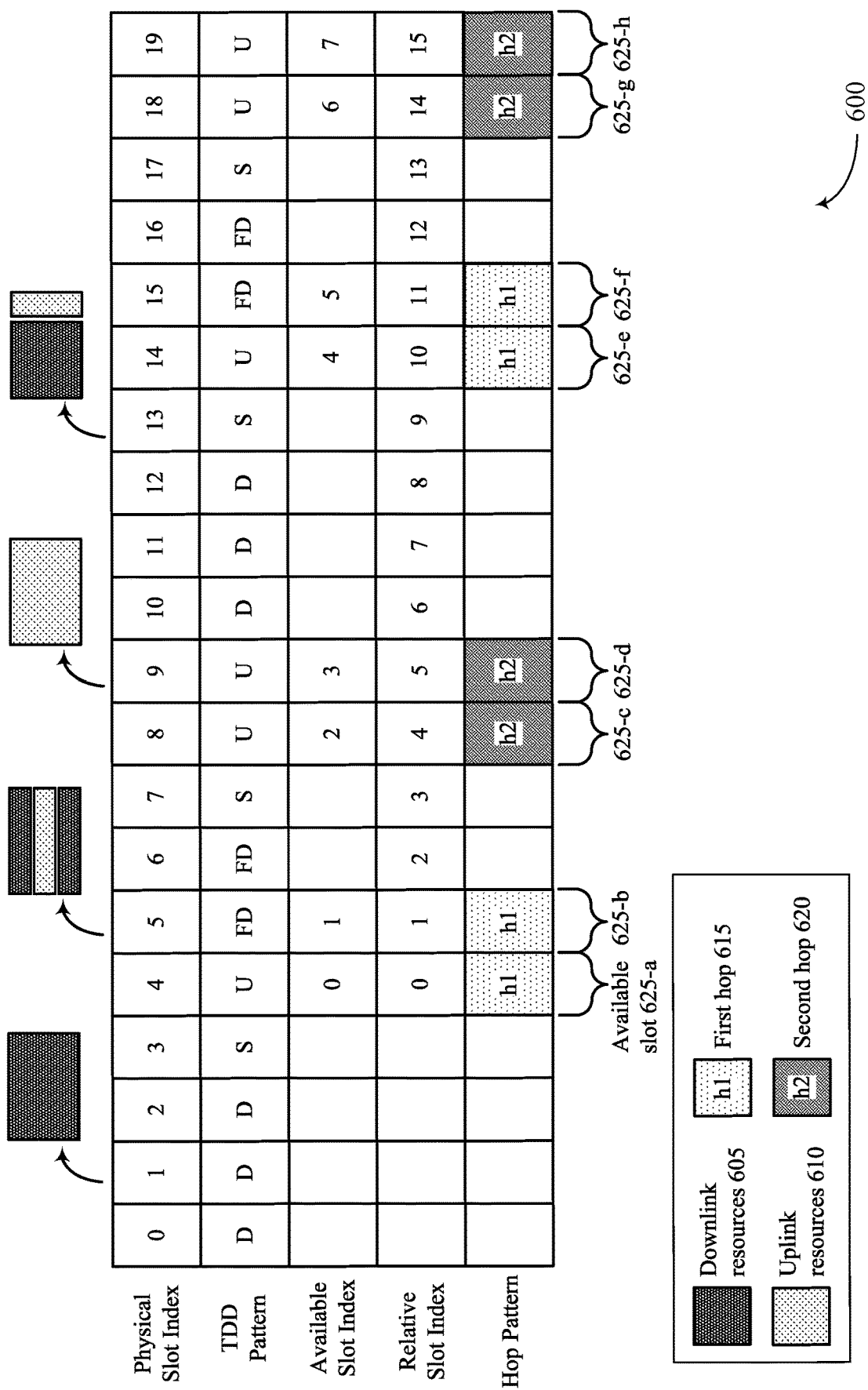

FIG. 6 illustrates an example of a frequency hopping configuration 600 that supports frequency hopping and available slot determination for full-duplex operation in accordance with one or more aspects of the present disclosure. In some examples, the frequency hopping configuration 600 may be implemented by aspects of the wireless communications systems 100 and 200. For example, a UE may use the frequency hopping configuration 600 to determine one or more frequency hopping patterns based on relative slot indices and with DMRS bundling enabled. In addition, the UE may use the frequency hopping configuration 600 to perform available slot determination, which may increase resource efficiency and improve communications between the UE and a network entity, among other benefits.

As described herein with reference to FIG. 5, a UE may determine a set of available resources (e.g., slots) for transmitting an uplink message and one or more repetitions of the uplink message to a network entity before determining a frequency hopping pattern to use for transmitting the uplink message. For example, the UE may receive a control message from the network entity indicating the frequency hopping configuration 600, the UE may determine a set of available resources, and the UE may determine the frequency hopping pattern based on the set of available resources and in accordance with the frequency hopping configuration 600.

The frequency hopping configuration 600 may indicate twenty physical slot indices ranging from a physical slot index of 0 to a physical slot index of 19. In addition, the frequency hopping configuration 600 may indicate a TDD pattern (e.g., a TDD slot pattern), which may repeat each ten slots. The TDD pattern may indicate whether a particular slot is configured as a downlink slot (e.g., "D") an uplink slot (e.g., "U"), a special or split slot (e.g., "S"), or a full-duplex slot, such as an SBFD slot (e.g., "FD"). A downlink slot may include only downlink resources 605, and an uplink slot may include only uplink resources 610. In addition, a special or split slot may be divided between downlink resources 605 and uplink resources 610 in the time domain, and an SBFD slot may be divided between downlink resources 605 and uplink resources 610 in the frequency domain. For example, a slot corresponding to a physical slot index 1 may be a downlink slot including only downlink resources 605, a slot corresponding to a slot index 5 may be an SBFD slot including some downlink resources 605 and some uplink resources 610 divided in frequency, a slot corresponding to a slot index 9 may be an uplink slot including only uplink resources 610, and a slot corresponding to a slot index 13 may be a special or split slot including some downlink resources 605 and some uplink resources 610 divided in time.

The UE may perform the available slot determination procedure to determine a set of available slots 625 for two or more transmissions of an uplink message (e.g., a set of uplink slots or SBFD slots that include at least some uplink resources 610). In some examples, the UE may identify an uplink slot corresponding to a physical slot index 4, which may be an earliest slot via which the UE may transmit an uplink message (e.g., a PUCCH transmission). The UE may check whether time and frequency-domain resources are available in the slot. If sufficient time and frequency-domain resources are available in the slot for transmitting the uplink message, the UE may select the slot as an available slot 625-a (e.g., a first available slot), and the UE may assign the available slot 625-a an available slot index 0. In addition, the available slot 625-a may correspond to a relative slot index 0, and each subsequent slot after the available slot 625-a (e.g., including downlink, special, uplink, and SBFD slots) may correspond to consecutive relative slot indices 0 through 15.

In some examples, the UE may determine a frequency hopping pattern based on the relative slot indices assigned to each available slot 625 and based on DMRS bundling being enabled. As the relative slot indices may determine the location of frequency-domain resources with respect to the available slot 625-a (e.g., the first available slot), the UE may continue searching for a next available slot 625 if the frequency-domain resources are unavailable in a desired slot. Put another way, for each individual relative slot index, the UE may have a desired location for frequency-domain resources before knowing if the frequency-domain resources are indeed available in an available slot 625. If a given slot includes sufficient time-domain resources for the uplink message, the UE may determine that slot as an available slot 625.

In addition, whether the UE uses a first hop 615 or a second hop 620 in an available slot 625 may be based on DMRS bundling. Because of DMRS bundling being enabled for the frequency hopping configuration 600, the UE may determine a frequency hopping pattern such that a same frequency hop index (e.g., h1 or h2) is used over multiple available slots 625 that are consecutive, where the frequency hopping pattern is still based on the relative slot indices. In some cases, a quantity of available slots 625 that are consecutive and in which a same frequency hop index (e.g., corresponding to the first hop 615 or the second hop 620) may be used may be based on a configured hop duration (e.g., transmitted to the UE by a network entity via an RRC configuration message). Accordingly, a size of a DMRS bundle (e.g., a nominal TDW) may span a same quantity of slots as the hop duration. For example, the UE may receive a control message (e.g., RRC signaling) indicating a DMRS bundling configuration. Based on the DMRS bundling configuration and the set of available resources, the UE may determine that the resources are indeed available for transmitting two or more transmissions of the uplink message. The UE may transmit the uplink message and repetitions of the uplink message using the frequency hopping pattern based on the available resources and the DMRS bundling configuration, where the frequency hopping pattern includes two or more repeated frequency-domain resources (e.g., hops).

In the example of FIG. 6, the UE may be configured to use a hop duration of two. After identifying the available slot 625-a, the UE may assign the first hop 615 to the available slot 625-a (e.g., based on the time and frequency-domain resources of the available slot 625-a accommodating the first hop 615), the UE may check whether each remaining slot included in the frequency hopping configuration 600 (e.g., slots corresponding to physical slot indices 5 through 19 and respective relative slot indices 1 through 15) includes sufficient time and frequency resources for transmitting an uplink message. The UE may check SBFD slots corresponding to physical slot indices 5 and 6, and may determine that frequency-domain resources for the first hop 615 are available for the physical slot index 5 and unavailable for the physical slot index 6. As such, the SBFD slot corresponding to the physical slot index 5 may be an available slot 625-b with an available slot index 1, while the SBFD slot corresponding to the physical slot index 6 may be excluded from the set of available slots 625. In addition, the UE may assign the first hop 615 to the available slot 625-b based on the hop duration, such that the first hop 615 may be repeated in the available slot 625-a and the available slot 625-b (e.g., a consecutive slot).

Continuing to check the remaining slots for frequency-domain resource availability, the UE may check the uplink slots corresponding to physical slot indices 8 and 9 and identify that sufficient time and frequency-domain resources are available in the uplink slots for transmitting at least one repetition of the uplink message using the second hop 620. As such, the UE may identify the uplink slot corresponding to the physical slot index 8 as an available slot 625-c with an available slot index 2, and the uplink slot corresponding to the physical slot index 9 as an available slot 625-d with an available slot index 3. Based on the time and frequency-domain resources of the available slot 625-c and the available slot 625-d accommodating the second hop 620, the UE may assign the second hop 620 to both the available slot 625-c and the available slot 625-d, such that the second hop 620 may be repeated across the consecutive available slots.

Additionally, the UE may identify that sufficient time and frequency-domain resources are available for transmitting at least one repetition of the uplink message using the first hop 615 in an uplink slot corresponding to a physical slot index 14 and an SBFD slot corresponding to a physical slot index 15. As such, the UE may identify the uplink slot as an available slot 625-e with an available slot index 4, and the SBFD slot as an available slot 625-f with an available slot index 5. Based on the time and frequency-domain resources of the available slot 625-e and the available slot 625-f accommodating the first hop 615, the UE may assign the first hop 615 to the available slot 625-e and the available slot 625-f. In some cases, the UE may check an SBFD slot corresponding to physical slot index 16 and may determine that frequency-domain resources for the second hop 620 are unavailable. As such, the SBFD slot corresponding to the physical slot index 16 may be excluded from the set of available slots 625.

In addition, the UE may identify that sufficient time and frequency-domain resources are available for transmitting the repetitions of the uplink message using the second hop 620 in uplink slots corresponding to a physical slot indices 18 and 19. As such, the UE may identify the uplink slot as an available slot 625-g with an available slot index 6, and the SBFD slot as an available slot 625-*h* with an available slot index 7. Based on the time and frequency-domain resources of the available slot 625-*g* and the available slot 625-*h* accommodating the second hop 620, the UE may assign the second hop 620 to the available slot 625-*g* and available slot 625-*h*. As such, the UE may perform a joint search of time-domain resources and frequency-domain resources in each slot included in the frequency hopping configuration 600 when DMRS bundling is enabled, and the UE may use the relative slot indices based on the availability of the time and frequency-domain resources to determine locations of the first hops 615 and the second hops 620 in the frequency hopping pattern.

Figure 7:
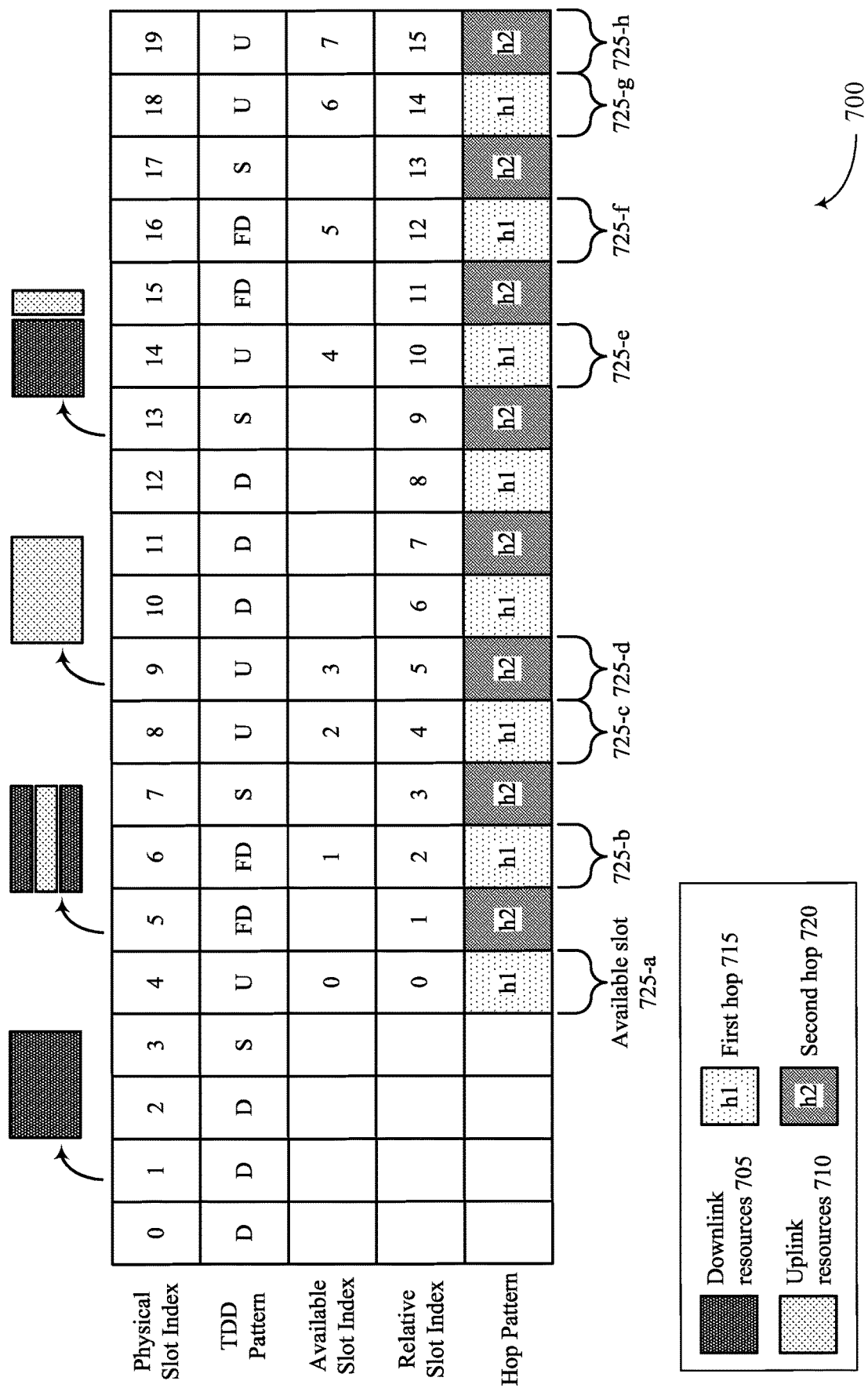

FIG. 7 illustrates an example of a frequency hopping configuration 700 that supports frequency hopping and available slot determination for full-duplex operation in accordance with one or more aspects of the present disclosure. In some examples, the frequency hopping configuration 700 may be implemented by aspects of the wireless communications systems 100 and 200. For example, a UE may use the frequency hopping configuration 700 to determine one or more frequency hopping patterns. In addition, the UE may use the frequency hopping configuration 700 to perform available slot determination, which may increase resource efficiency and improve communications between the UE and a network entity, among other benefits.

In some examples, when SBFD operation is enabled, a frequency hopping pattern may have precedence over available slot determination. For example, a UE may determine a frequency hopping pattern (e.g., an inter-slot frequency hopping pattern) independent of in which slots an uplink message and repetitions of the uplink message (e.g., PUCCH repetitions) may eventually be transmitted. The UE may determine the set of available slots after determining the frequency hopping pattern, where the available slots may be associated with physical slot indices. In this way, the UE may be aware of frequency-domain resources that may be used in each slot.

When determining a frequency hopping pattern before the available slots, the UE may check the availability of resources in a time domain and in a frequency domain. That is, the UE may rely on the determined frequency hopping pattern to know which time and frequency resources are available. In some cases, only when frequency hopping is enabled, the UE may perform the available slot determination to check for availability of both time and frequency-domain resources (e.g., otherwise, the UE may check for the availability of just time-domain resources). Alternatively, the UE may check the availability of the resources in the time and frequency domains when frequency hopping is disabled. The UE may use a frequency hopping pattern (e.g., an inter-slot frequency hopping pattern) to communicate with a network entity using changing carrier frequencies in a particular pattern (e.g., using multiple hops).

In some examples, the UE may use the frequency hopping configuration 700 to determine time and frequency-domain resource availability. As described with reference to FIG. 3, the frequency hopping configuration 700 may indicate a set of physical slot indices, which may include twenty physical slot indices ranging from a physical slot index of 0 to a physical slot index of 19. In addition, the frequency hopping configuration 700 may indicate a TDD pattern (e.g., a TDD slot pattern), which may repeat each ten slots. The TDD pattern may indicate whether a particular slot may be configured as a downlink slot (e.g., for downlink communications, "D,") an uplink slot (e.g., for uplink communications, "U,"), a special or split slot (e.g., for downlink and uplink communications, "S,"), or a full-duplex slot, such as an SBFD slot (e.g., for full-duplex communications, "FD,").

A downlink slot may include only downlink resources 705, and an uplink slot may include only uplink resources 710. In addition, a special or split slot may be divided between downlink resources 705 and uplink resources 710 in the time domain, and an SBFD slot may be divided between downlink resources 705 and uplink resources 710 in the frequency domain. For example, a slot corresponding to a physical slot index 1 may be a downlink slot including only downlink resources 705, a slot corresponding to a slot index 5 may be an SBFD slot including some downlink resources 705 and some uplink resources 710 divided in frequency, a slot corresponding to a slot index 9 may be an uplink slot including only uplink resources 710, and a slot corresponding to a slot index 13 may be a special or split slot including some downlink resources 705 and some uplink resources 710 divided in time.

The UE may determine the frequency hopping pattern, which may include one or more first hops 715 (e.g., h1) and one or more second hops 720 (e.g., h2). In some examples, the first hops 715 may use uplink resources 710 and the second hops 720 may use downlink resources 705. The frequency hopping pattern may include alternating first hops 715 and second hops 720 in consecutive slots. In the example of FIG. 7, a first slot corresponding to the physical slot index 4 may include a first hop 715, a second slot corresponding to a physical slot index 5 may include a second hop 720, a third slot corresponding to a physical slot index 6 may include a first hop 715, and so on.

In some examples, the UE may determine the frequency hopping pattern based on the physical slot indices. For example, the UE may assume that a first available slot corresponds to a physical slot index 4, and accordingly, the UE may begin the frequency hopping pattern in the slot corresponding to the physical slot index 4. Alternatively, the UE may receive a grant (e.g., a physical downlink shared channel (PDSCH) grant) from the network entity via a downlink slot corresponding to a physical slot index 0, and the UE may decode the grant in the same downlink slot or in a subsequent downlink slot (e.g., corresponding to a physical slot index 1). In some cases, the grant may indicate that the UE is to transmit a PUCCH carrying feedback (e.g., HARQ ACK/NACK) via the uplink slot corresponding to the physical slot index 4 and subsequent uplink and SBFD slots. Based on the indication in the grant, the UE may implicitly assume that the physical slot index 4 corresponds to an available slot 725 (e.g., an available slot 725-*a*). As such, the UE may transmit the PUCCH using the uplink slot corresponding to the physical slot index 4, the uplink slot in which the frequency hopping pattern may begin.

In some cases, in determining the frequency hopping pattern, the UE may select the available slot 725-*a* (e.g., a first available slot) that is available in the time domain and the frequency domain for two or more transmissions of an uplink message (e.g., the uplink message and one or more repetitions of the uplink message) based on the available slots 725 and the uplink message. The available slot 725-*a* may correspond to a first frequency-domain resource (e.g., a first hop 715) of the frequency hopping pattern. In addition, the UE may select the available slot 725-*b* (e.g., a second available slot) that is available in the time domain and the frequency domain for the two or more transmissions of the uplink message based on the available slots 725 and the uplink message. The available slot 725-*b* may correspond to a second frequency-domain resource (e.g., a second hop 720) of the frequency hopping pattern that is different from the first frequency-domain resource.

After determining the frequency hopping pattern, the UE may perform an available slot determination procedure to determine a set of slots that include uplink resources 710 and are available for two or more transmissions of an uplink message. For example, the UE may determine that a set of slots is available based on slot formats for respective slots. Here, the slot format may indicate whether a slot supports full-duplex communications, and the determination of available slots may be based on whether respective slots are associated with full-duplex resources (e.g., SBFD resources). In some cases, the UE may identify an available slot 725-*a* corresponding to the physical slot index 4, an available slot 725-*b* corresponding to the physical slot index 6, an available slot 725-*c* corresponding to the physical slot index 8, an available slot 725-*d* corresponding to the physical slot index 9, an available slot 725-*e* corresponding to the physical slot index 14, an available slot 725-*f* corresponding to the physical slot index 16, an available slot 725-*g* corresponding to the physical slot index 18, and an available slot 725-*h* corresponding to the physical slot index 19.

Beginning from the available slot 725-*a* (e.g., the first slot identified as available, corresponding to the physical slot index 4), the frequency hopping configuration 700 may indicate a corresponding available slot index for each available slot 725 and a corresponding relative slot index for each slot following the available slot 725-*a*. For example, the available slot 725-*a* slot may correspond to a relative slot index and each subsequent slot after the available slot 725-*a* (e.g., including downlink, special, uplink, and SBFD slots) may correspond to consecutive relative slot indices 0 through 15. In addition, each available slot 725 may correspond to an available slot index based on the available slot 725-*a*. For example, the available slots 725-*a*, 725-*b*, 725-*c*, 725-*d*, 725-*e*, 725-*f*, 725-*g*, and 725-*h* may correspond to available slot indices 0, 1, 2, 3, 4, 5, 6, and 7, respectively.

The slots corresponding to the physical slot indices 4, 8, 9, 14, 18, and 19 may be uplink slots and include only uplink resources 710. In addition, the slots corresponding to the physical slot indies 6 and 16 may be SBFD slots and include some downlink resources 705 and some uplink resources 710. Because the UE is using the frequency hopping pattern to transmit uplink messages (e.g., PUCCHs), only the uplink resources 710 of the available SBFD slots may be used for the first hops 715 or the second hops 720. As such, based on the previously-determined frequency hopping pattern, the SBFD slots corresponding to the physical slot indices 6 and 16 may be available for the uplink transmissions because they support the first hops 715, which may be configured to use uplink resources 710.

Alternatively, SBFD slots corresponding to physical slot indices 5 and 15 may be unavailable for the uplink transmissions because they may be associated with the second hops 720, where resources for the second hops 720 may be configured only for downlink purposes and may be unavailable in the SBFD slots corresponding to physical slot indices 5 and 15. For example, if the UE determines that, for a PUCCH transmission in an SBFD (e.g., full-duplex) slot, the available frequency resources in a given slot for the PUCCH transmission fail to accommodate the frequency resources of a corresponding PUCCH format, the UE may refrain from transmitting the PUCCH in that slot.

Figure 8:
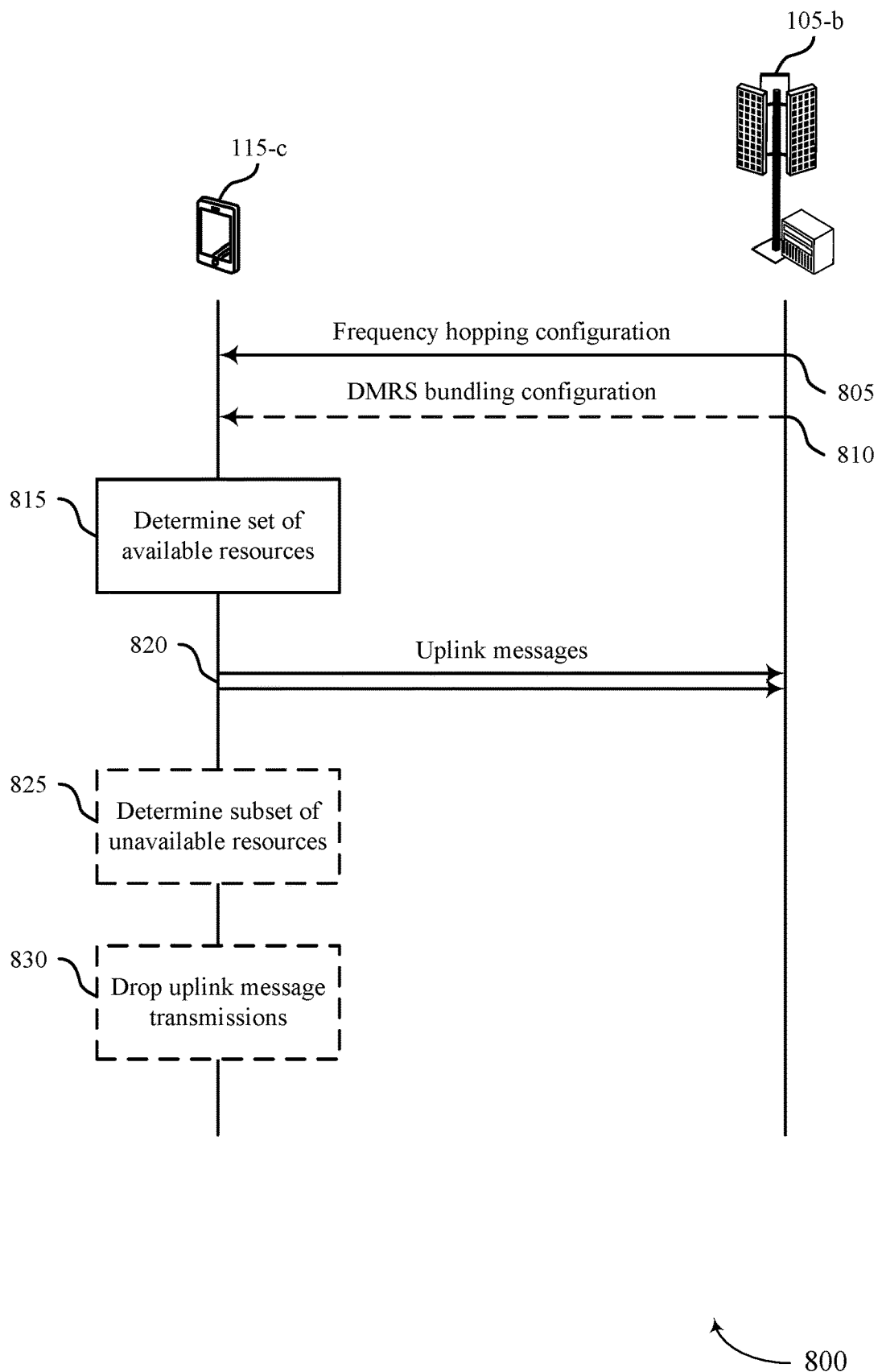
FIG. 8 illustrates an example of a process flow in a system that supports frequency hopping and available slot determination for full-duplex operation in accordance with one or more aspects of the present disclosure.

FIG. 8 illustrates an example of a process flow 800 in a system that supports frequency hopping and available slot determination for full-duplex operation in accordance with one or more aspects of the present disclosure. The process flow 800 may implement aspects of wireless communications systems 100 and 200, or may be implemented by aspects of the wireless communications system 100 and 200. For example, the process flow 800 may illustrate operations between a UE 115-*c* and a network entity 105-*b*, which may be examples of corresponding devices described herein. In the following description of the process flow 800, the operations between the UE 115-*c* and the network entity 105-*b* may be transmitted in a different order than the example order shown, or the operations performed by the UE 115-*c* and the network entity 105-*b* may be performed in different orders or at different times. Some operations may also be omitted from the process flow 800, and other operations may be added to the process flow 800.

At 805, the UE 115-*c* may receive, from the network entity 105-*b*, a control message (e.g., an RRC message) indicating a frequency hopping configuration for one or more repetitions of an uplink message, the one or more repetitions of the uplink message to be transmitted via a set of resources that includes one or more resources that support full-duplex communications (e.g., one or more full-duplex communication resources). The full-duplex communication resources may be SBFD resources that include one or more uplink and downlink sub-bands (e.g., divided in frequency).

At 810, the UE 115-*c* may receive, from the network entity 105-*b*, a second control message indicating a DMRS bundling configuration. The DMRS bundling configuration may include a hop duration, which may indicate how many times a UE 115-*c* is to repeat a same frequency-domain resource consecutively in the frequency hopping pattern.

At 815, the UE 115-*c* may determine that multiple resources of the set of resources are available for the one or more repetitions of the uplink message based on a quantity of the one or more repetitions and the set of resources. For example, the UE 115-*c* may determine that multiple resources are available in the time domain based on a quantity of symbol periods associated with the uplink message, a format of the uplink message, or a combination thereof. In some aspects, the UE 115-*c* may determine a frequency hopping pattern based on the available resources identified by the UE 115-*c* (e.g., at 815). Here, the determination of the available resources and the frequency hopping pattern may be performed independently by the UE 115-*c*. In other examples, the UE 115-*c* may determine the frequency hopping pattern before determining that multiple resources of the set of resources are available for the one or more repetitions of the uplink message (e.g., at 815).

At 820, the UE 115-*c* may transmit, to the network entity 105-*b*, the uplink message and the one or more repetitions of the uplink message using a frequency hopping pattern that is based on the set of available resources and in accordance with the frequency hopping configuration, where the frequency hopping pattern may include two or more frequency-domain resources that each correspond to a respective resource of the set of available resources. That is, the UE 115-*c* may determine the frequency hopping configuration after determining the available slots. The frequency-domain resources may include any quantity of frequency hops, which may alternate in the set of available resources according to the DMRS bundling configuration and the hop duration.

At 825, the UE 115-*c* may determine that a subset of resources of the set of resources is unavailable for the one or more repetitions of the uplink message based on the set of resources and an FDRA associated with the one or more repetitions of the uplink message. That is, after determining the set of available resources based on a TDRA associated with the one or more repetitions of the uplink message, the UE 115-*c* may evaluate the FDRA and determine that the subset of resources may fail to accommodate the repetitions of the uplink message.

At 830, the UE 115-*c* may drop respective transmissions of the one or more repetitions of the uplink message based on the subset of resources being unavailable (e.g., at least in the frequency domain). The UE 115-*c* may refrain from replacing the dropped transmissions.

Figure 9:
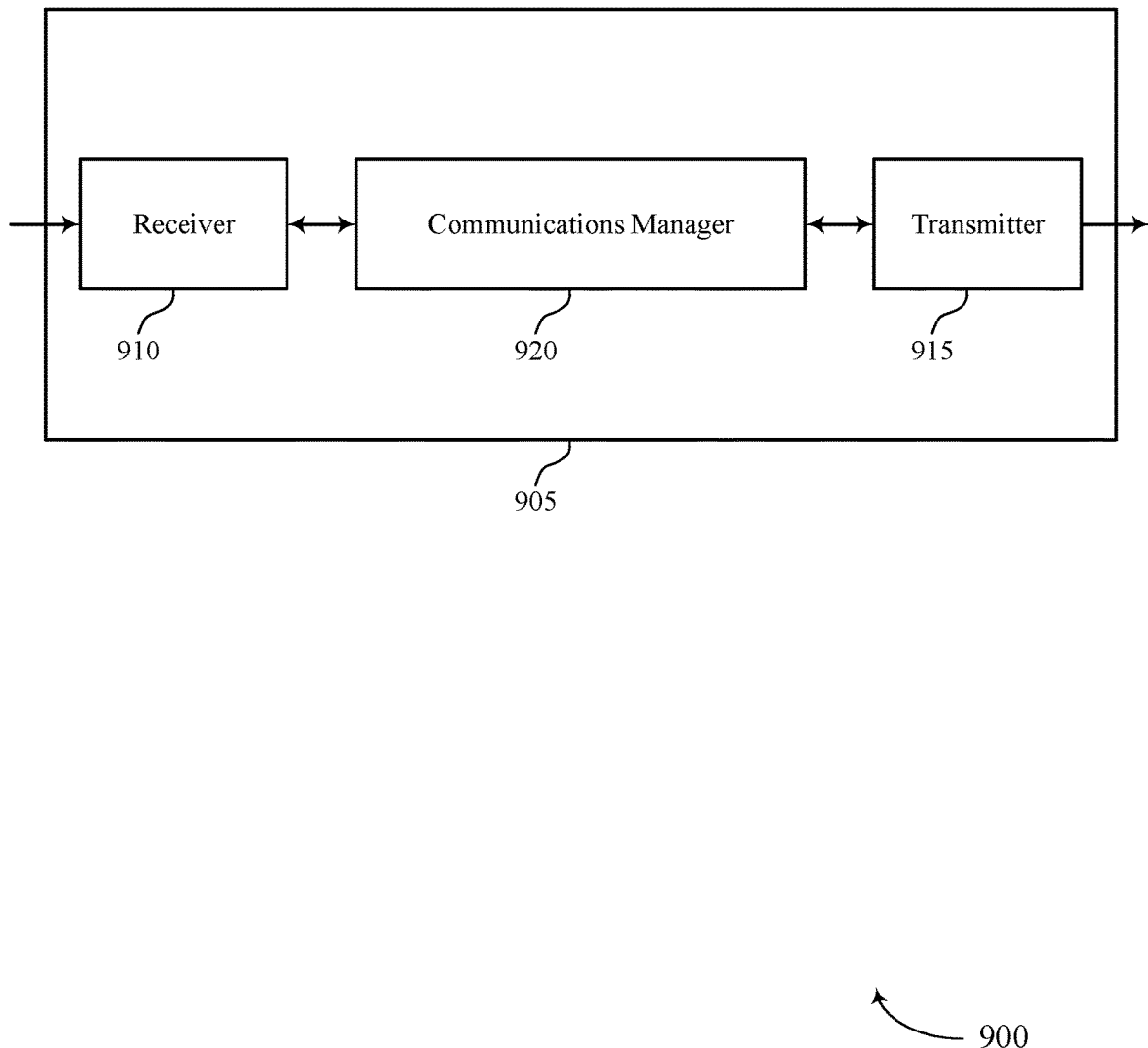
FIGS. 9 and 10 show block diagrams of devices that support frequency hopping and available slot determination for full-duplex operation in accordance with one or more aspects of the present disclosure.

FIG. 9 shows a block diagram 900 of a device 905 that supports frequency hopping and available slot determination for full-duplex operation in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to frequency hopping and available slot determination for full-duplex operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to frequency hopping and available slot determination for full-duplex operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of frequency hopping and available slot determination for full-duplex operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The communications manager 920 may be configured as or otherwise support a means for determining a set of multiple available resources of the set of resources for the one or more repetitions of the uplink message based on a quantity of the one or more repetitions of the uplink message and the set of resources. The communications manager 920 may be configured as or otherwise support a means for transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

Additionally, or alternatively, the communications manager 920 may support wireless communication at a UE in accordance with examples as disclosed herein. For example, the communications manager 920 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The communications manager 920 may be configured as or otherwise support a means for determining a frequency hopping pattern based on the frequency hopping configuration and the set of resources. The communications manager 920 may be configured as or otherwise support a means for determining a set of multiple available resources based on the frequency hopping pattern. The communications manager 920 may be configured as or otherwise support a means for transmitting the uplink transmission and the one or more repetitions of the uplink message using the set of multiple available resources and the frequency hopping pattern.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for frequency hopping and available slot determination for full-duplex operation, which may increase resource efficiency, decrease failed transmissions, and improve communications between wireless devices.

Figure 10:
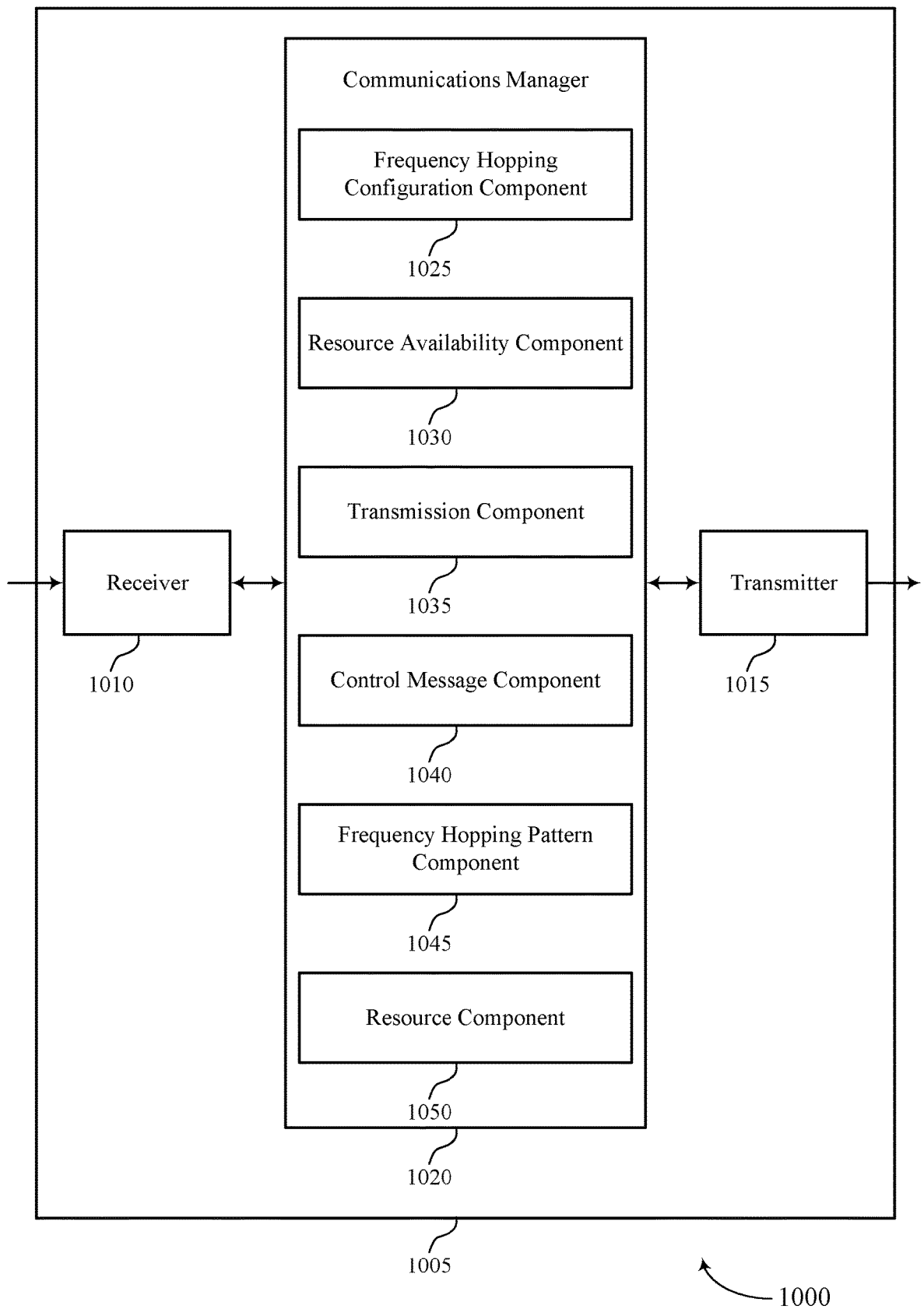

FIG. 10 shows a block diagram 1000 of a device 1005 that supports frequency hopping and available slot determination for full-duplex operation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to frequency hopping and available slot determination for full-duplex operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to frequency hopping and available slot determination for full-duplex operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of frequency hopping and available slot determination for full-duplex operation as described herein. For example, the communications manager 1020 may include a frequency hopping configuration component 1025, a resource availability component 1030, a transmission component 1035, a control message component 1040, a frequency hopping pattern component 1045, a resource component 1050, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The frequency hopping configuration component 1025 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The resource availability component 1030 may be configured as or otherwise support a means for determining a set of multiple available resources of the set of resources for the one or more repetitions of the uplink message based on a quantity of the one or more repetitions of the uplink message and the set of resources. The transmission component 1035 may be configured as or otherwise support a means for transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

Additionally, or alternatively, the communications manager 1020 may support wireless communication at a UE in accordance with examples as disclosed herein. The control message component 1040 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The frequency hopping pattern component 1045 may be configured as or otherwise support a means for determining a frequency hopping pattern based on the frequency hopping configuration and the set of resources. The resource component 1050 may be configured as or otherwise support a means for determining a set of multiple available resources based on the frequency hopping pattern. The transmission component 1035 may be configured as or otherwise support a means for transmitting the uplink transmission and the one or more repetitions of the uplink message using the set of multiple available resources and the frequency hopping pattern.

Figure 11:
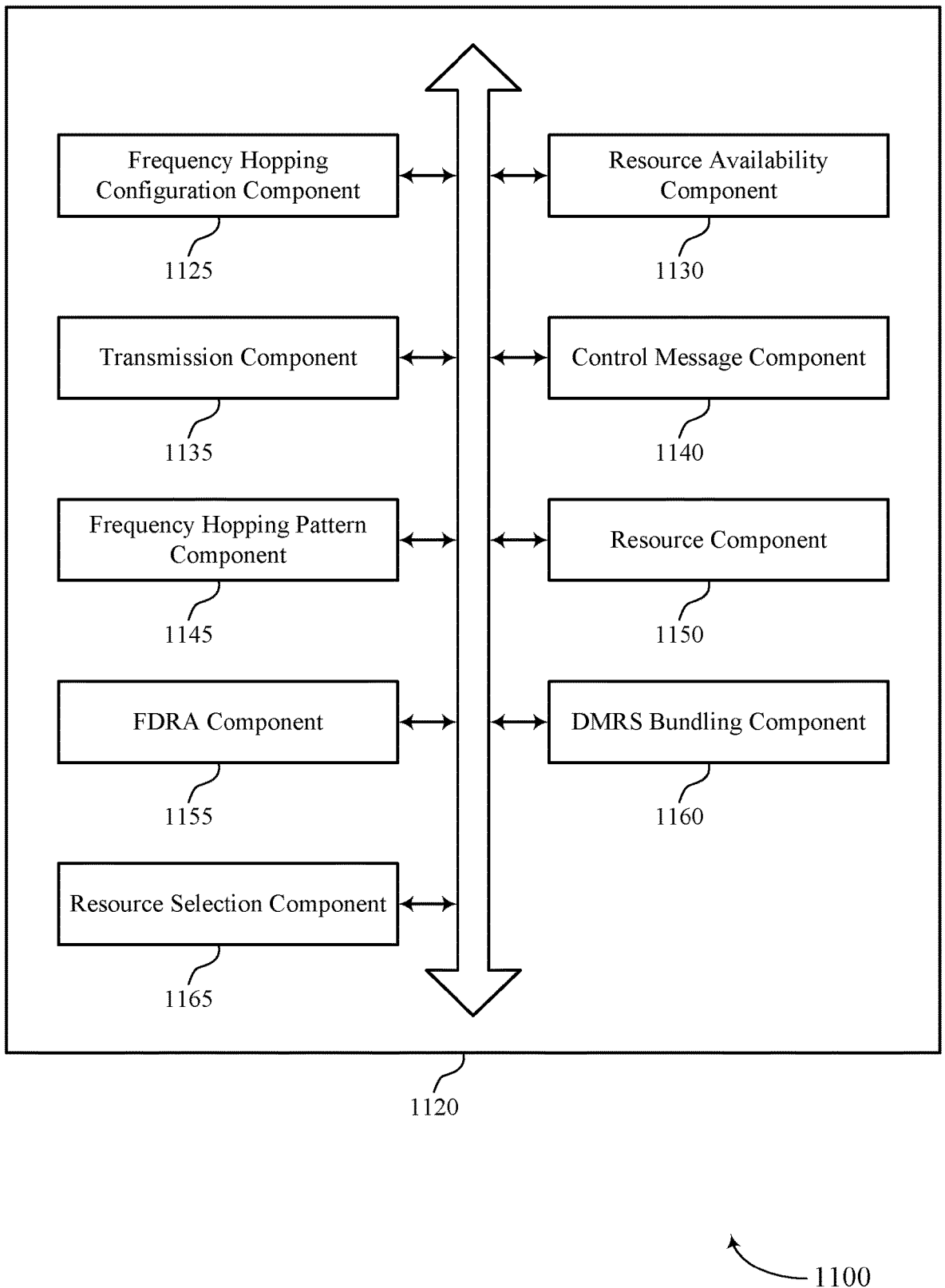
FIG. 11 shows a block diagram of a communications manager that supports frequency hopping and available slot determination for full-duplex operation in accordance with one or more aspects of the present disclosure.

FIG. 11 shows a block diagram 1100 of a communications manager 1120 that supports frequency hopping and available slot determination for full-duplex operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of frequency hopping and available slot determination for full-duplex operation as described herein. For example, the communications manager 1120 may include a frequency hopping configuration component 1125, a resource availability component 1130, a transmission component 1135, a control message component 1140, a frequency hopping pattern component 1145, a resource component 1150, an FDRA component 1155, a DMRS bundling component 1160, a resource selection component 1165, or any combination thereof. Each of these components may communicate, directly or indirectly, with one another (e.g., via one or more buses).

The communications manager 1120 may support wireless communication at a UE in accordance with examples as disclosed herein. The frequency hopping configuration component 1125 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The resource availability component 1130 may be configured as or otherwise support a means for determining a set of multiple available resources of the set of resources for the one or more repetitions of the uplink message based on a quantity of the one or more repetitions of the uplink message and the set of resources. The transmission component 1135 may be configured as or otherwise support a means for transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

In some examples, the FDRA component 1155 may be configured as or otherwise support a means for determining that a subset of resources of the set of resources is unavailable for the one or more repetitions of the uplink message based on the set of resources and a frequency domain resource allocation associated with the one or more repetitions of the uplink message. In some examples, the FDRA component 1155 may be configured as or otherwise support a means for dropping respective transmissions of the one or more repetitions of the uplink message based on the subset of resources being unavailable.

In some examples, to support determining the set of multiple available resources, the resource availability component 1130 may be configured as or otherwise support a means for determining that each available resource of the set of multiple available resources is available in a time domain for the one or more repetitions of the uplink message based on a quantity of symbol periods associated with each transmission of the one or more repetitions of the uplink message.

In some examples, to support determining the set of multiple available resources, the resource availability component 1130 may be configured as or otherwise support a means for determining the set of multiple available resources based on a format of the one or more repetitions of the uplink message.

In some examples, receiving a second control message indicating a demodulation reference signal bundling configuration. In some examples, to determine the set of multiple available resources, the DMRS bundling component 1160 may be configured as or otherwise support a means for determining the set of multiple available resources for the one or more repetitions of the uplink message based on the set of resources and the demodulation reference signal bundling configuration, where the one or more repetitions of the uplink message are transmitted using the frequency hopping pattern that is based on the set of multiple available resources and the demodulation reference signal bundling configuration, the frequency hopping pattern including two or more repeated frequency-domain resources.

In some examples, the frequency hopping configuration corresponds to inter-slot frequency hopping for the one or more repetitions of the uplink message. In some examples, the set of multiple available resources are determined based on a slot format for respective resources of the set of resources. In some examples, the slot format indicates whether a slot supports the full-duplex communications.

Additionally, or alternatively, the communications manager 1120 may support wireless communication at a UE in accordance with examples as disclosed herein. The control message component 1140 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The frequency hopping pattern component 1145 may be configured as or otherwise support a means for determining a frequency hopping pattern based on the frequency hopping configuration and the set of resources. The resource component 1150 may be configured as or otherwise support a means for determining a set of multiple available resources based on the frequency hopping pattern. In some examples, the transmission component 1135 may be configured as or otherwise support a means for transmitting the uplink transmission and the one or more repetitions of the uplink message using the set of multiple available resources and the frequency hopping pattern.

In some examples, to support determining the set of multiple available resources, the resource component 1150 may be configured as or otherwise support a means for determining that each resource of the set of multiple available resources is available in a time domain and a frequency domain based on the frequency hopping configuration.

In some examples, the resource component 1150 may be configured as or otherwise support a means for selecting a first resource that is available in both the time domain and the frequency domain for the one or more repetitions of the uplink message based on the set of resources and the one or more repetitions of the uplink message, where the first available resource corresponds to a first frequency hop of the frequency hopping pattern.

In some examples, the resource component 1150 may be configured as or otherwise support a means for selecting a second resource that is available in both the time domain and the frequency domain for the one or more repetitions of the uplink message based on the set of resources and the one or more repetitions of the uplink message, where the second available resource corresponds to a second frequency hop of the frequency hopping pattern that is different from the first frequency hop.

In some examples, the frequency hopping configuration corresponds to inter-slot frequency hopping for the two or more uplink messages. In some examples, the set of multiple available resources are determined based on a slot format for respective resources of the set of resources. In some examples, the slot format indicates whether a slot supports the full-duplex communications.

Figure 12:
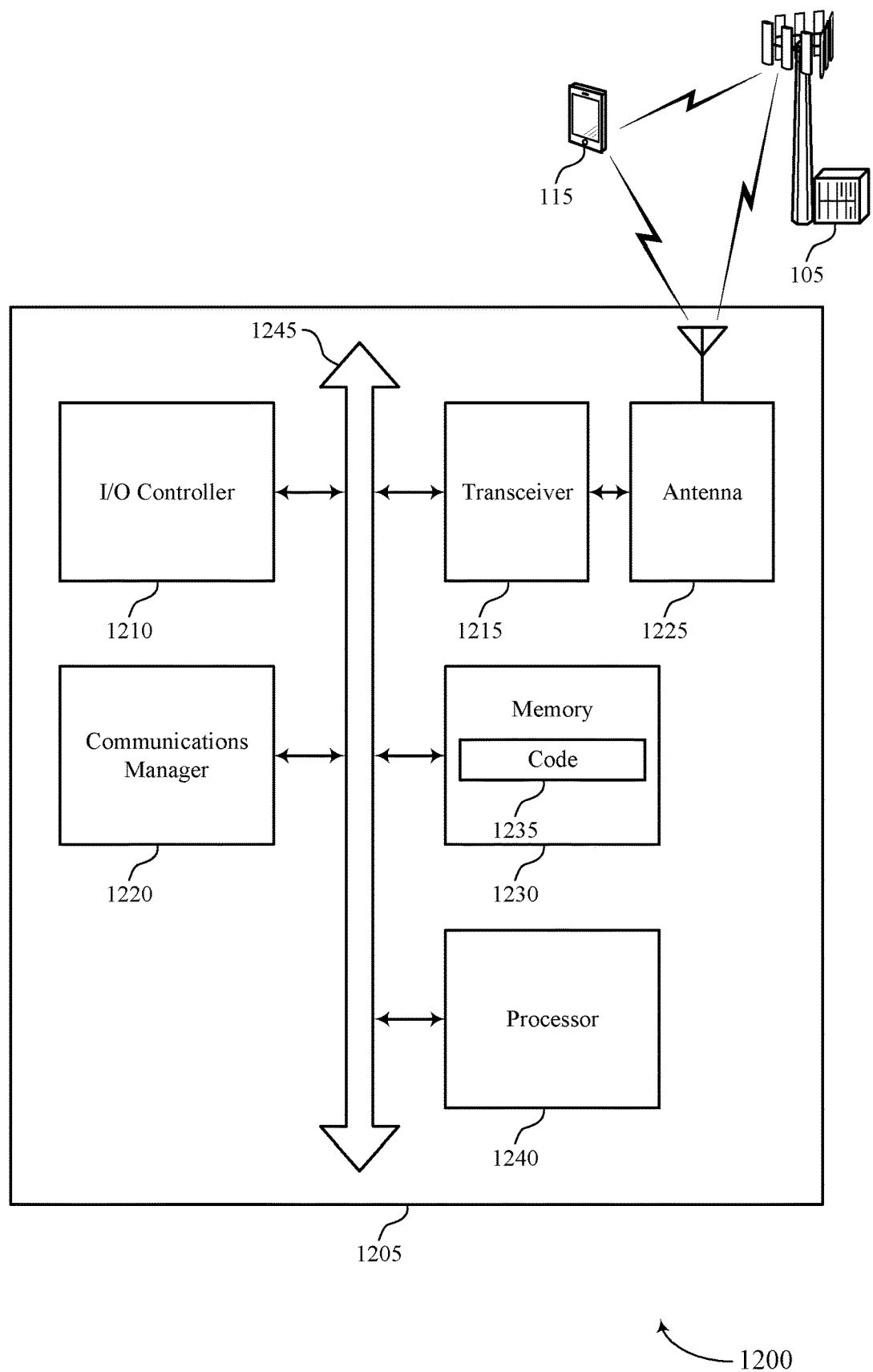
FIG. 12 shows a diagram of a system including a device that supports frequency hopping and available slot determination for full-duplex operation in accordance with one or more aspects of the present disclosure.

FIG. 12 shows a diagram of a system 1200 including a device 1205 that supports frequency hopping and available slot determination for full-duplex operation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting frequency hopping and available slot determination for full-duplex operation). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The communications manager 1220 may be configured as or otherwise support a means for determining a set of multiple available resources of the set of resources for the one or more repetitions of the uplink message based on a quantity of the one or more repetitions of the uplink message and the set of resources. The communications manager 1220 may be configured as or otherwise support a means for transmitting the uplink message and the one or more repetitions of the uplink message using a frequency hopping pattern that is based on the set of multiple available resources and in accordance with the frequency hopping configuration, where the frequency hopping pattern includes two or more frequency-domain resources that each correspond to a respective available resource of the set of multiple available resources.

Additionally, or alternatively, the communications manager 1220 may support wireless communication at a UE in accordance with examples as disclosed herein. For example, the communications manager 1220 may be configured as or otherwise support a means for receiving a control message indicating a frequency hopping configuration for one or more repetitions of an uplink message, the one or more repetitions of the uplink message to be transmitted via a set of resources that includes one or more resources that support full-duplex communications. The communications manager 1220 may be configured as or otherwise support a means for determining a frequency hopping pattern based on the frequency hopping configuration and the set of resources. The communications manager 1220 may be configured as or otherwise support a means for determining a set of multiple available resources based on the frequency hopping pattern. The communications manager 1220 may be configured as or otherwise support a means for transmitting the uplink transmission and the one or more repetitions of the uplink message using the set of multiple available resources and the frequency hopping pattern.

By including or configuring the communications manager 1220 in accordance with examples as described herein, the device 1205 may support techniques for frequency hopping and available slot determination for full-duplex operation, which may increase resource efficiency, decrease failed transmissions, and improve communications between wireless devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of frequency hopping and available slot determination for full-duplex operation as described herein, or the processor 1240 and the memory 1230 may be otherwise configured to perform or support such operations.

Figure 13:
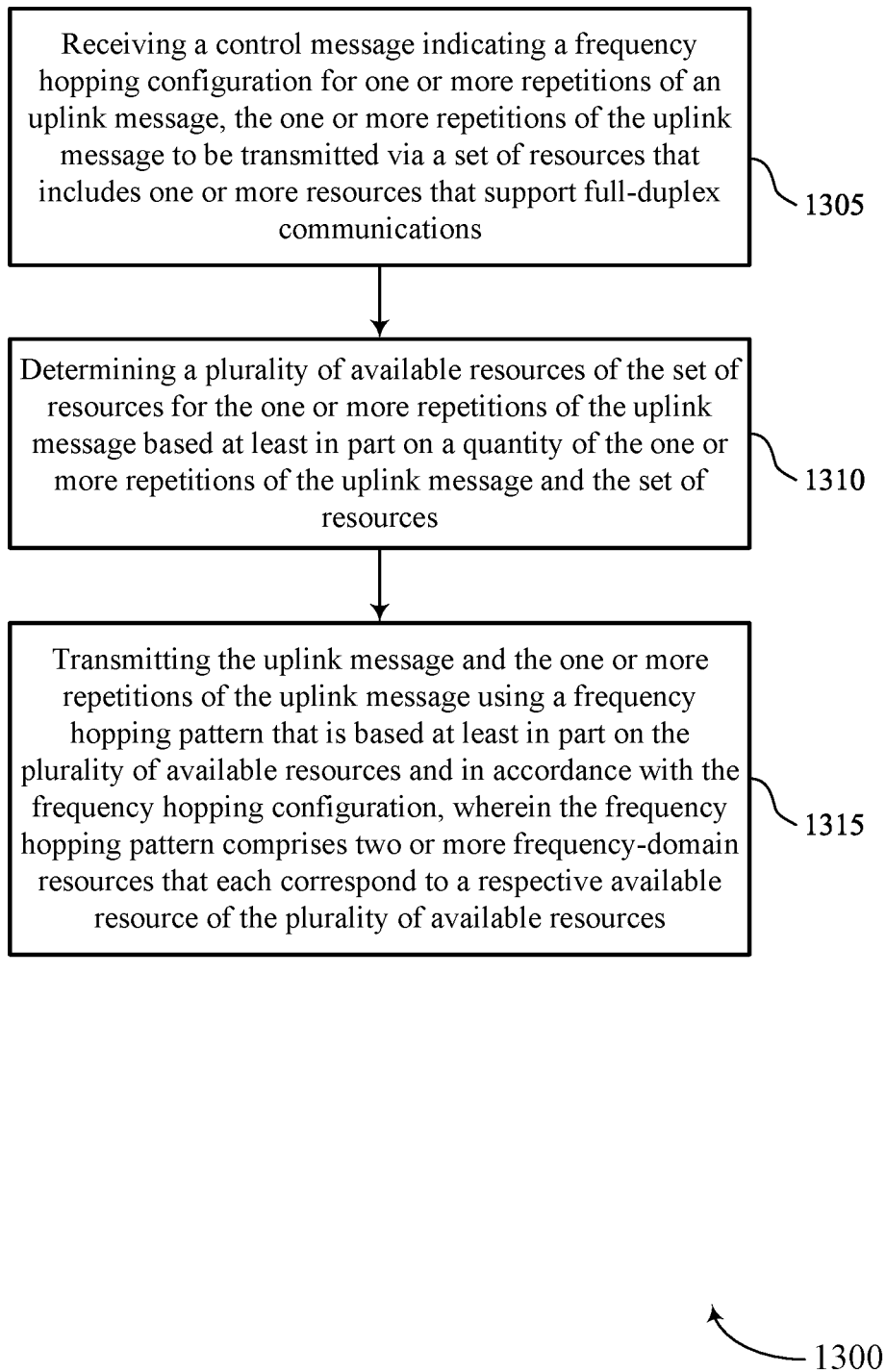
FIGS. 13 through 16 show flowcharts illustrating methods that support frequency hopping and available slot determination for full-duplex operation in accordance with one or more aspects of the present disclosure.

FIG. 13 shows a flowchart illustrating a method 1300 that supports frequency hopping and available slot determination for full-duplex operation in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating a frequency hopping configuration for one or more repetitions of an uplink message, the one or more repetitions of the uplink message to be transmitted via a set of resources that includes one or more resources that support full-duplex communications. The operations of 1305 may be performed in accordance with examples as disclosed herein. In some examples, aspects of the operations of 1305 may be performed by a frequency hopping configuration component 1125 as described with reference to FIG. 11.

At 1310, the method may include determining a plurality of available resources of the set of resources for the one or more repetitions of the uplink message based at least in part on a quantity of the one or more repetitions of the uplink message and the set of resources. The operations of 1310 may be performed in accordance with examples as disclosed herein. In some examples, aspects of the operations of 1310 may be performed by a resource availability component 1130 as described with reference to FIG. 11.

At 1315, the method may include transmitting the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources. The operations of 1315 may be performed in accordance with examples as disclosed herein. In some examples, aspects of the operations of 1315 may be performed by a transmission component 1135 as described with reference to FIG. 11.

Figure 14:
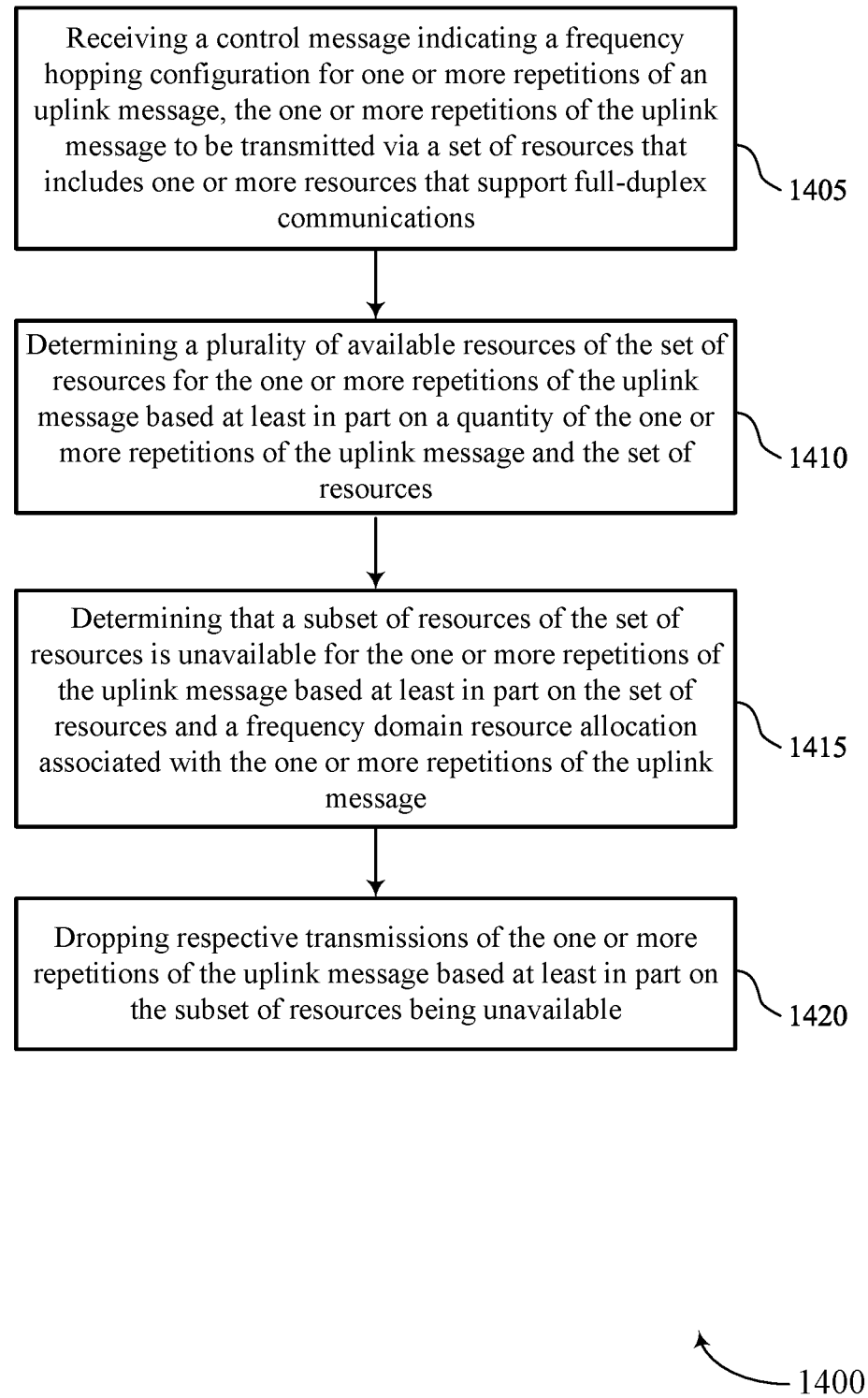

FIG. 14 shows a flowchart illustrating a method 1400 that supports frequency hopping and available slot determination for full-duplex operation in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include receiving a control message indicating a frequency hopping configuration for one or more repetitions of an uplink message, the one or more repetitions of the uplink message to be transmitted via a set of resources that includes one or more resources that support full-duplex communications. The operations of 1405 may be performed in accordance with examples as disclosed herein. In some examples, aspects of the operations of 1405 may be performed by a frequency hopping configuration component 1125 as described with reference to FIG. 11.

At 1410, the method may include determining a plurality of available resources of the set of resources for the one or more repetitions of the uplink message based at least in part on a quantity of the one or more repetitions of the uplink message and the set of resources. The operations of 1410 may be performed in accordance with examples as disclosed herein. In some examples, aspects of the operations of 1410 may be performed by a resource availability component 1130 as described with reference to FIG. 11.

At 1415, the method may include determining that a subset of resources of the set of resources is unavailable for the one or more repetitions of the uplink message based at least in part on the set of resources and a frequency domain resource allocation associated with the one or more repetitions of the uplink message. The operations of 1415 may be performed in accordance with examples as disclosed herein. In some examples, aspects of the operations of 1415 may be performed by an FDRA component 1155 as described with reference to FIG. 11.

At 1420, the method may include dropping respective transmissions of the one or more repetitions of the uplink message based at least in part on the subset of resources being unavailable. The operations of 1420 may be performed in accordance with examples as disclosed herein. In some examples, aspects of the operations of 1420 may be performed by an FDRA component 1155 as described with reference to FIG. 11.

Figure 15:
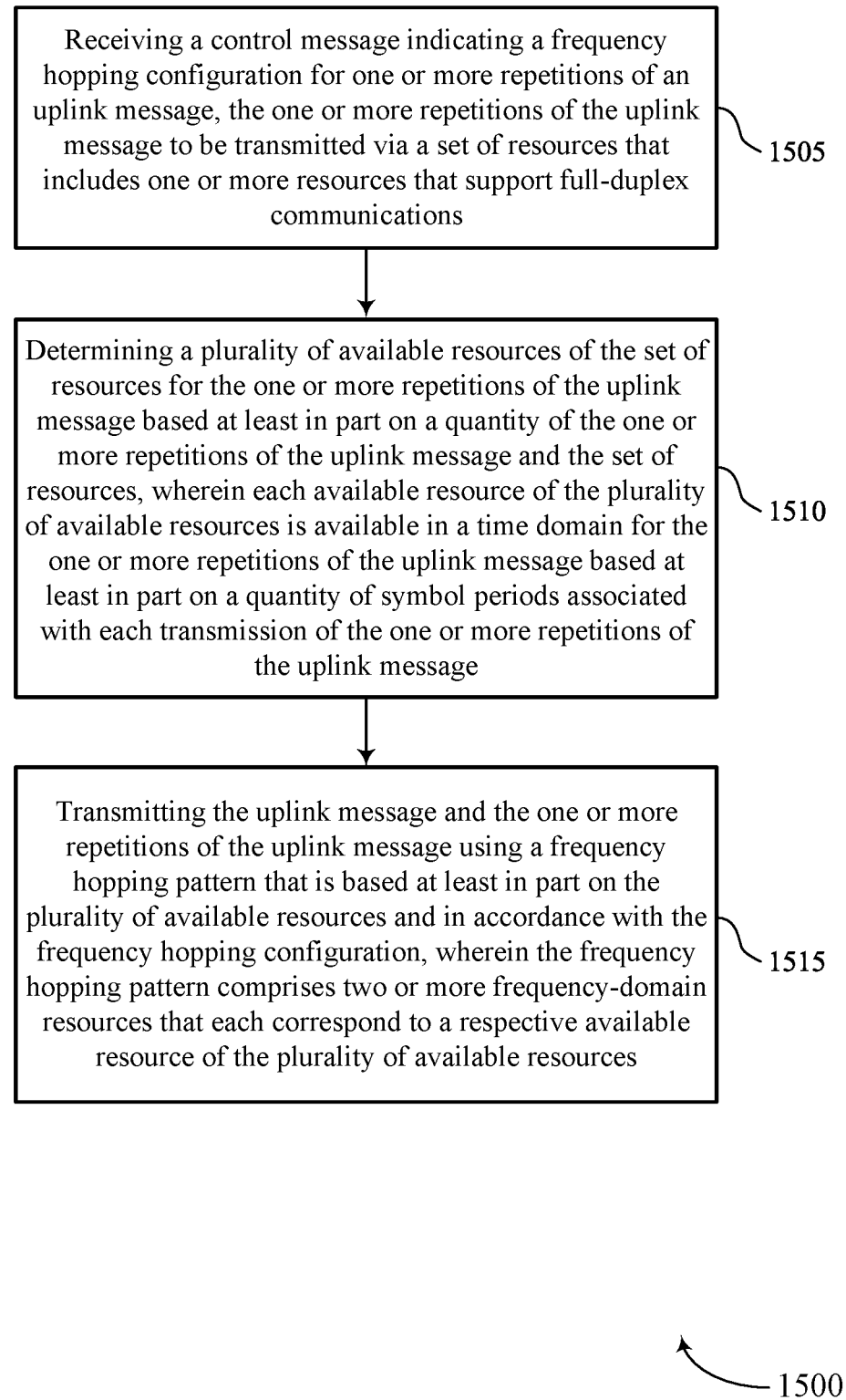

FIG. 15 shows a flowchart illustrating a method 1500 that supports frequency hopping and available slot determination for full-duplex operation in accordance with one or more aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving a control message indicating a frequency hopping configuration for one or more repetitions of an uplink message, the one or more repetitions of the uplink message to be transmitted via a set of resources that includes one or more resources that support full-duplex communications. The operations of 1505 may be performed in accordance with examples as disclosed herein. In some examples, aspects of the operations of 1505 may be performed by a frequency hopping configuration component 1125 as described with reference to FIG. 11.

At 1510, the method may include determining a plurality of available resources of the set of resources for the one or more repetitions of the uplink message based at least in part on a quantity of the one or more repetitions of the uplink message and the set of resources, wherein each available resource of the plurality of available resources is available in a time domain for the one or more repetitions of the uplink message based at least in part on a quantity of symbol periods associated with each transmission of the one or more repetitions of the uplink message. The operations of 1510 may be performed in accordance with examples as disclosed herein. In some examples, aspects of the operations of 1510 may be performed by a resource availability component 1130 as described with reference to FIG. 11.

At 1520, the method may include transmitting the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources. The operations of 1520 may be performed in accordance with examples as disclosed herein. In some examples, aspects of the operations of 1520 may be performed by a transmission component 1135 as described with reference to FIG. 11.

Figure 16:
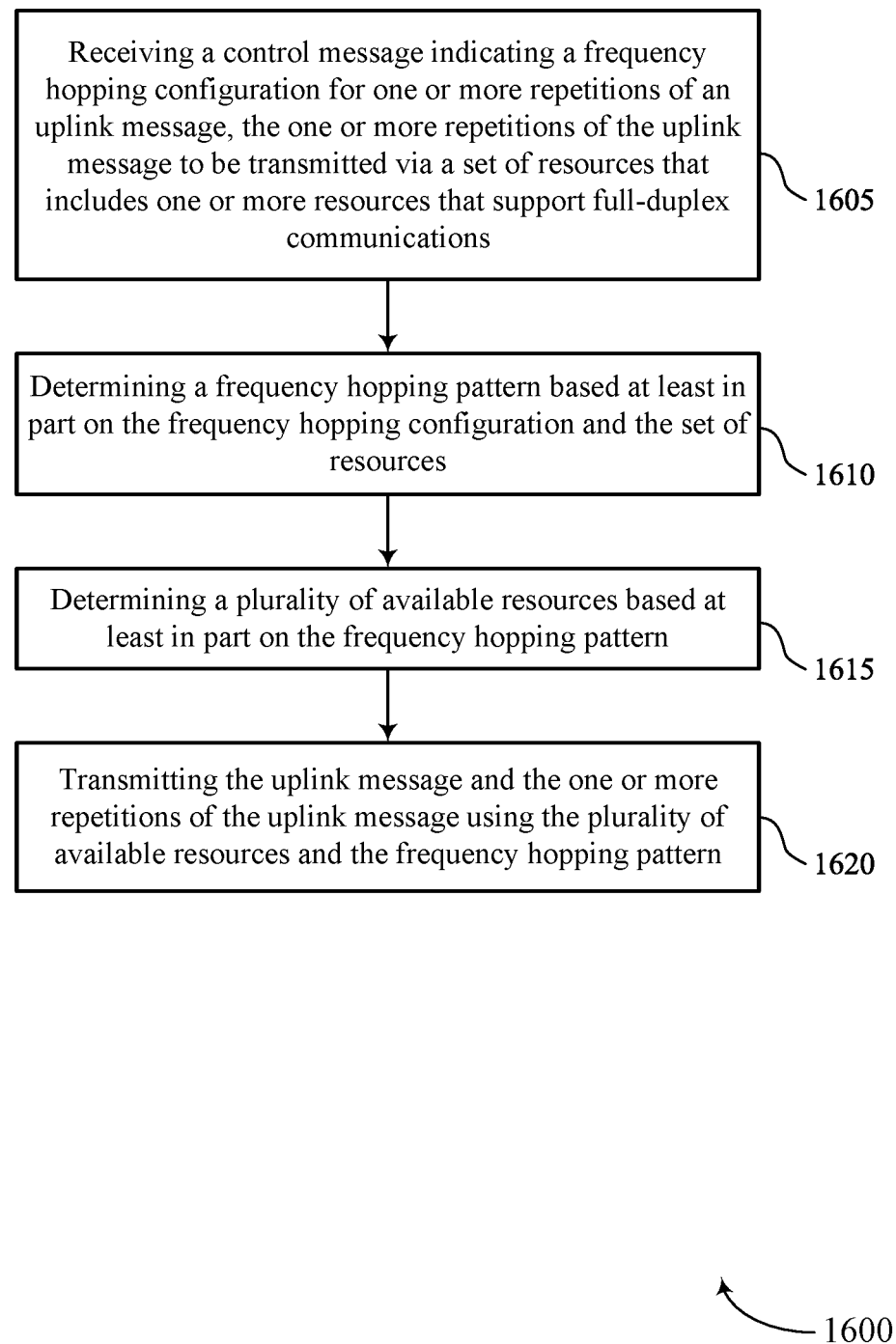

FIG. 16 shows a flowchart illustrating a method 1600 that supports frequency hopping and available slot determination for full-duplex operation in accordance with one or more aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include receiving a control message indicating a frequency hopping configuration for one or more repetitions of an uplink message, the one or more repetitions of the uplink message to be transmitted via a set of resources that includes one or more resources that support full-duplex communications. The operations of 1605 may be performed in accordance with examples as disclosed herein. In some examples, aspects of the operations of 1605 may be performed by a control message component 1140 as described with reference to FIG. 11.

At 1610, the method may include determining a frequency hopping pattern based at least in part on the frequency hopping configuration and the set of resources. The operations of 1610 may be performed in accordance with examples as disclosed herein. In some examples, aspects of the operations of 1610 may be performed by a frequency hopping pattern component 1145 as described with reference to FIG. 11.

At 1615, the method may include determining a plurality of available resources based at least in part on the frequency hopping pattern. The operations of 1615 may be performed in accordance with examples as disclosed herein. In some examples, aspects of the operations of 1615 may be performed by a resource component 1150 as described with reference to FIG. 11.

At 1620, the method may include transmitting the uplink message and the one or more repetitions of the uplink message using the plurality of available resources and the frequency hopping pattern. The operations of 1620 may be performed in accordance with examples as disclosed herein. In some examples, aspects of the operations of 1620 may be performed by a transmission component 1135 as described with reference to FIG. 11.

The following provides an overview of aspects of the present disclosure:

Aspect 1: A method for wireless communication at a UE, comprising: receiving a control message indicating a frequency hopping configuration for one or more repetitions of an uplink message, the one or more repetitions of the uplink message to be transmitted via a set of resources that includes one or more resources that support full-duplex communications; determining a plurality of available resources of the set of resources for the one or more repetitions of the uplink message based at least in part on a quantity of the one or more repetitions of the uplink message and the set of resources; and transmitting the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources.

Aspect 2: The method of aspect 1, further comprising: determining that a subset of resources of the set of resources is unavailable for the one or more repetitions of the uplink message based at least in part on the set of resources and an FDRA associated with the one or more repetitions of the uplink message; and dropping respective transmissions of the one or more repetitions of the uplink message based at least in part on the subset of resources being unavailable.

Aspect 3: The method of any of aspects 1 through 2, wherein determining the plurality of available resources comprises: determining that each available resource of the plurality of available resources is available in a time domain for the one or more repetitions of the uplink message based at least in part on a quantity of symbol periods associated with each transmission of the one or more repetitions of the uplink message.

Aspect 4: The method of aspect 3, wherein determining the plurality of available resources comprises: determining the plurality of available resources based at least in part on a format of the one or more repetitions of the uplink message.

Aspect 5: The method of any of aspects 1 through 4, further comprising: wherein respective resources of the plurality of available resources are determined based at least in part on a respective slot index, and wherein a first available resource of the plurality of available resources corresponds to a first frequency hop of the frequency hopping pattern and a second available resource of the plurality of available resources corresponds to a second frequency hop of the frequency hopping pattern.

Aspect 6: The method of any of aspects 1 through 5, wherein the frequency hopping configuration corresponds to inter-slot frequency hopping for the one or more repetitions of the uplink message.

Aspect 7: The method of any of aspects 1 through 6, wherein the plurality of available resources are determined based at least in part on a slot format for respective resources of the set of resources.

Aspect 8: The method of aspect 7, wherein the slot format indicates whether a slot supports the full-duplex communications.

Aspect 9: A method for wireless communication at a UE, comprising: receiving a control message indicating a frequency hopping configuration for one or more repetitions of an uplink message, the one or more repetitions of the uplink message to be transmitted via a set of resources that includes one or more resources that support full-duplex communications; determining a frequency hopping pattern based at least in part on the frequency hopping configuration and the set of resources; determining a plurality of available resources of the set of resources for the one or more repetitions of the uplink message based at least in part on the frequency hopping pattern; and transmitting the uplink message and the one or more repetitions of the uplink message using the plurality of available resources and the frequency hopping pattern.

Aspect 10: The method of aspect 9, wherein determining the plurality of available resources comprises: determining that each available resource of the plurality of available resources is available in a time domain and a frequency domain for the one or more repetitions of the uplink message based at least in part on the frequency hopping configuration.

Aspect 11: The method of aspect 10, wherein respective resources of the plurality of available resources determined based at least in part on a respective slot index, and wherein a first available resource of the plurality of available resources corresponds to a first frequency hop of the frequency hopping pattern and a second available resource of the plurality of available resources corresponds to a second frequency hop of the frequency hopping pattern that is different from the first frequency hop.

Aspect 12: The method of any of aspects 9 through 11, wherein the frequency hopping configuration corresponds to inter-slot frequency hopping for the one or more repetitions of the uplink message.

Aspect 13: The method of any of aspects 9 through 12, wherein the plurality of available resources are determined based at least in part on a slot format for respective resources of the set of resources.

Aspect 14: The method of aspect 13, wherein the slot format indicates whether a slot supports the full-duplex communications.

Aspect 15: An apparatus for wireless communication at a UE, comprising a processor; and a memory coupled with the processor, wherein the memory comprises instructions executable by the processor to cause the apparatus to perform a method of any of aspects 1 through 8.

Aspect 16: An apparatus for wireless communication at a UE, comprising at least one means for performing a method of any of aspects 1 through 8.

Aspect 17: A non-transitory computer-readable medium storing code for wireless communication at a UE, the code comprising instructions executable by a processor to perform a method of any of aspects 1 through 8.

Aspect 18: An apparatus for wireless communication at a UE, comprising a processor; and a memory coupled with the processor; wherein the memory comprises instructions executable by the processor to cause the apparatus to perform a method of any of aspects 9 through 14.

Aspect 19: An apparatus for wireless communication at a UE, comprising at least one means for performing a method of any of aspects 9 through 14.

Aspect 20: A non-transitory computer-readable medium storing code for wireless communication at a UE, the code comprising instructions executable by a processor to perform a method of any of aspects 9 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a control message indicating a frequency hopping configuration for one or more repetitions of an uplink message, the one or more repetitions of the uplink message to be transmitted via a set of resources that includes one or more resources that support full-duplex communications;
determining a plurality of available resources of the set of resources for the one or more repetitions of the uplink message based at least in part on a quantity of the one or more repetitions of the uplink message and the set of resources;
determining that a subset of resources of the set of resources is unavailable for the one or more repetitions of the uplink message based at least in part on the set of resources and a frequency domain resource allocation associated with the one or more repetitions of the uplink message;
dropping respective transmissions of the one or more repetitions of the uplink message based at least in part on the subset of resources being unavailable; and
transmitting the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources.

2. The method of claim 1, wherein determining the plurality of available resources comprises:
determining that each available resource of the plurality of available resources is available in a time domain for the one or more repetitions of the uplink message based at least in part on a quantity of symbol periods associated with each transmission of the one or more repetitions of the uplink message.

3. The method of claim 2, wherein determining the plurality of available resources comprises:
determining the plurality of available resources based at least in part on a format of the one or more repetitions of the uplink message.

4. The method of claim 1, wherein respective resources of the plurality of available resources are determined based at least in part on a respective slot index, and wherein a first available resource of the plurality of available resources corresponds to a first frequency hop of the frequency hopping pattern and a second available resource of the plurality of available resources corresponds to a second hop of the frequency hopping pattern.

5. The method of claim 1, wherein the frequency hopping configuration corresponds to inter-slot frequency hopping for the one or more repetitions of the uplink message.

6. The method of claim 1, wherein the plurality of available resources are determined based at least in part on a slot format for respective resources of the set of resources.

7. The method of claim 6, wherein the slot format indicates whether a slot supports the full-duplex communications.

8. An apparatus for wireless communication at a user equipment (UE), comprising:
a processor; and
a memory coupled with the processor, wherein the memory comprises instructions executable by the processor to cause the apparatus to:
receive a control message indicating a frequency hopping configuration for one or more repetitions of an uplink message, the one or more repetitions of the uplink message to be transmitted via a set of resources that includes one or more resources that support full-duplex communications;
determine a plurality of available resources of the set of resources for the one or more repetitions of the uplink message based at least in part on a quantity of the one or more repetitions of the uplink message and the set of resources;

determine that a subset of resources of the set of resources is unavailable for the one or more repetitions of the uplink message based at least in part on the set of resources and a frequency domain resource allocation associated with the one or more repetitions of the uplink message;

drop respective transmissions of the one or more repetitions of the uplink message based at least in part on the subset of resources being unavailable; and transmit the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources.

9. The apparatus of claim 8, wherein the instructions to determine the plurality of available resources are executable by the processor to cause the apparatus to:
determine that each available resource of the plurality of available resources is available in a time domain for the one or more repetitions of the uplink message based at least in part on a quantity of symbol periods associated with each transmission of the one or more repetitions of the uplink message.

10. The apparatus of claim 9, wherein the instructions to determine the plurality of available resources are executable by the processor to cause the apparatus to:
determine the plurality of available resources based at least in part on a format of the one or more repetitions of the uplink message.

11. The apparatus of claim 8, wherein respective resources of the plurality of available resources are determined based at least in part on a respective slot index, and wherein a first available resource of the plurality of available resources corresponds to a first frequency hop of the frequency hopping pattern and a second available resource of the plurality of available resources corresponds to a second frequency hop of the frequency hopping pattern.

12. The apparatus of claim 8, wherein the frequency hopping configuration corresponds to inter-slot frequency hopping for the one or more repetitions of the uplink message.

13. The apparatus of claim 8, wherein the plurality of available resources are determined based at least in part on a slot format for respective resources of the set of resources.

14. The apparatus of claim 13, wherein the slot format indicates whether a slot supports the full-duplex communications.

15. A non-transitory computer-readable medium storing code for wireless communication at a user equipment (UE), the code comprising instructions executable by a processor to:
receive a control message indicating a frequency hopping configuration for one or more repetitions of an uplink message, the one or more repetitions of the uplink message to be transmitted via a set of resources that includes one or more resources that support full-duplex communications;
determine a plurality of available resources of the set of resources for the one or more repetitions of the uplink message based at least in part on a quantity of the one or more repetitions of the uplink message and the set of resources;

determine that a subset of resources of the set of resources is unavailable for the one or more repetitions of the uplink message based at least in part on the set of resources and a frequency domain resource allocation associated with the one or more repetitions of the uplink message;

drop respective transmissions of the one or more repetitions of the uplink message based at least in part on the subset of resources being unavailable; and transmit the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources.

16. The non-transitory computer-readable medium of claim 15, wherein the instructions to determine the plurality of available resources are executable by the processor to:
determine that each available resource of the plurality of available resources is available in a time domain for the one or more repetitions of the uplink message based at least in part on a quantity of symbol periods associated with each transmission of the one or more repetitions of the uplink message.

17. The non-transitory computer-readable medium of claim 16, wherein the instructions to determine the plurality of available resources are executable by the processor to:
determine the plurality of available resources based at least in part on a format of the one or more repetitions of the uplink message.

18. The non-transitory computer-readable medium of claim 15, wherein respective resources of the plurality of available resources are determined based at least in part on a respective slot index, and wherein a first available resource of the plurality of available resources corresponds to a first frequency hop of the frequency hopping pattern and a second available resource of the plurality of available resources corresponds to a second frequency hop of the frequency hopping pattern.

19. The non-transitory computer-readable medium of claim 15, wherein the frequency hopping configuration corresponds to inter-slot frequency hopping for the one or more repetitions of the uplink message.

20. The non-transitory computer-readable medium of claim 15, wherein the plurality of available resources are determined based at least in part on a slot format for respective resources of the set of resources.

21. The non-transitory computer-readable medium of claim 20, wherein the slot format indicates whether a slot supports the full-duplex communications.

22. An apparatus for wireless communication at a user equipment (UE), comprising:
means for receiving a control message indicating a frequency hopping configuration for one or more repetitions of an uplink message, the one or more repetitions of the uplink message to be transmitted via a set of resources that includes one or more resources that support full-duplex communications;
means for determining a plurality of available resources of the set of resources for the one or more repetitions of the uplink message based at least in part on a quantity of the one or more repetitions of the uplink message and the set of resources;

means for determining that a subset of resources of the set of resources is unavailable for the one or more repetitions of the uplink message based at least in part on the set of resources and a frequency domain resource allocation associated with the one or more repetitions of the uplink message;

means for dropping respective transmissions of the one or more repetitions of the uplink message based at least in part on the subset of resources being unavailable; and means for transmitting the uplink message and the one or more repetitions of the uplink message using a frequency hopping pattern that is based at least in part on the plurality of available resources and in accordance with the frequency hopping configuration, wherein the frequency hopping pattern comprises two or more frequency-domain resources that each correspond to a respective available resource of the plurality of available resources.

23. The apparatus of claim 22, wherein the means for determining the plurality of available resources comprise:

means for determining that each available resource of the plurality of available resources is available in a time domain for the one or more repetitions of the uplink message based at least in part on a quantity of symbol periods associated with each transmission of the one or more repetitions of the uplink message.

24. The apparatus of claim 22, wherein the means for determining the plurality of available resources comprise:

means for determining the plurality of available resources based at least in part on a format of the one or more repetitions of the uplink message.

25. The apparatus of claim 22, wherein respective resources of the plurality of available resources are determined based at least in part on a respective slot index, and wherein a first available resource of the plurality of available resources corresponds to a first frequency hop of the frequency hopping pattern and a second available resource of the plurality of available resources corresponds to a second frequency hop of the frequency hopping pattern.

26. The apparatus of claim 22, wherein the frequency hopping configuration corresponds to inter-slot frequency hopping for the one or more repetitions of the uplink message.

* * * * *